United States Patent
Prabhu et al.

(10) Patent No.: US 7,065,771 B1
(45) Date of Patent: Jun. 20, 2006

(54) DISTRIBUTED TYPES AND PROXY REFINEMENT

(75) Inventors: Manish S. Prabhu, Redmond, WA (US); Tarun Anand, Bellevue, WA (US); Gopala Krishna R. Kakivaya, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 664 days.

(21) Appl. No.: 09/893,809

(22) Filed: Jun. 28, 2001

(51) Int. Cl.
*G06F 9/46* (2006.01)

(52) U.S. Cl. .................................................. 719/330
(58) Field of Classification Search ............... 719/230, 719/310, 330
See application file for complete search history.

(56) References Cited

U.S. PATENT DOCUMENTS

| | | | |
|---|---|---|---|
| 5,659,723 A * | 8/1997 | Dimitrios et al. ....... 707/103 R |
| 5,872,971 A | 2/1999 | Knapman et al. ........... 395/671 |
| 5,946,311 A | 8/1999 | Alexander, Jr. et al. .... 370/395 |
| 6,094,679 A | 7/2000 | Teng et al. ................. 709/220 |
| 6,182,155 B1 | 1/2001 | Cheng et al. |
| 6,360,137 B1 * | 3/2002 | Royal et al. ................ 700/231 |
| 6,412,010 B1 * | 6/2002 | Kind ........................... 709/230 |
| 6,415,434 B1 * | 7/2002 | Kind ........................... 171/107 |
| 6,442,570 B1 | 8/2002 | Wu |
| 6,457,013 B1 | 9/2002 | Saxton et al. |
| 6,549,918 B1 | 4/2003 | Probert, Jr. et al. |
| 6,944,642 B1 * | 9/2005 | Hopmann et al. .......... 709/203 |

OTHER PUBLICATIONS

M. Hicks, S. Jagannathan, R. Kelsey, J.T. Moore, and C. Ungureanu. Transparent Communication for Distributed Objects in Java. Proceedings of the ACM 1999 Conference on Java Grande, pp. 160-170, 1999.
Jintae Lee and Thomas W. Malone. Partially Shared Views: a Scheme for Commnicating among Groups that Use Different Type Hierarchies. ACM Transactions on Information Systems. vol. 8 Issue 1. pp. 1-26. 1990.
S. Hirano. HORB: Distributed Execution of Java Programs. In Proceedings of WWCA '97, vol. 1274 of LNCS, pp. 29-42, Springer, 1997.

* cited by examiner

*Primary Examiner*—William Thomson
*Assistant Examiner*—LeChi Truong
(74) *Attorney, Agent, or Firm*—Amin & Turocy, LLP

(57) ABSTRACT

A system and method for facilitating interactions between two or more entities where the entities have different versions of a data type is provided. The system includes a data type identifier that can identify whether interacting entities have a mismatched resolvable data type and a data type resolver that can resolve the data types by employing features appearing in the different resolvable data types that are common between the data types. The system employs a resolvable data type that includes attributes, methods and metadata, where the metadata describes the resolvable data type, its attributes and/or its methods. The resolvable data type may be associated with a proxy. The resolvable data type may also be adapted to be incrementally extended on an as-needed basis.

8 Claims, 14 Drawing Sheets

PRIOR ART FIG. 3

DISTRIBUTED TYPES AND PROXY REFINEMENT

TECHNICAL FIELD

The present invention generally relates to distributed object systems, and more particularly to providing distributed data types that provide resiliency between mismatched client and server data types, where the mismatch may involve data aspects (e.g., attributes) and/or behavior aspects (e.g., methods), and where the distributed data type may be incrementally extensible.

BACKGROUND OF THE INVENTION

As distributed object systems have become more popular, and as the ability to extend data types on client systems has become more simple, it has become more common for a server and a client in a distributed object system to have different versions of the same data type (where a data type is defined by a class, (e.g., includes methods, properties, fields)). Conventionally a data type mismatch prevents the client and server from interacting on the mismatched data types. With the increasing number of user created data types, such mismatching has increased. Thus, there remains a need for a system and method to mitigate problems associated with mismatched client and server data types.

A proxy is an image of an object where the object resides in a different logical and/or physical entity (e.g., machine, process, network). Proxies may be employed in distributed systems (where the proxy is a local image of a remote object) and in non-distributed systems (where the proxy is a local image of a local object). In distributed systems, proxies can be employed to facilitate local processing that may improve efficiency while in non-distributed systems proxies can be employed to facilitate actions like persisting an object. Proxies employed in remote processing may interact with a remote object that may reside across a remoting boundary (e.g., machine, domain). Proxies employed in local processing may interact with a local object that does not reside across a remoting boundary but which may still reside across a logical boundary (e.g., address space, process).

In a distributed object system, a client may create a proxy that images an object on a server. The object that is imaged may implement a first set of one or more interface and base class data types. The object that is imaged may require that a proxy load a first set of one or more attributes and/or methods to image the object. When the proxy is created for the object that is imaged, the interface and base data types implemented by the object are typically automatically loaded into the client. Such automatic loading consumes computing resources including time and memory for the typical case when the client interacts with the server object using only a subset of the data types implemented by the server object. Therefore there remains a need for a system and method to mitigate problems associated with loading data types in proxies imaging objects in distributed object systems.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Data types have two facets: a data facet, which includes the names and types of the fields implemented by the data type, and a behavior facet, which includes the methods and interfaces implemented by the data type. When a client interacts with a server, the interaction between the client and server may depend on a data type. Thus, the client may employ the behavior facet of the server data type. When a client invokes a method on the server, the client employs the behavior facet exposed by the server data type. In addition, the client exchanges data with the server in the form of input and output parameters to the method being invoked.

The present invention facilitates the client and server having different versions of the data being exchanged. For example, assume the client exchanges a data type called "Customer" with the server. The behavior facet associated with the Customer data type may be different between the client and the server (e.g., client and server may have different Customer data type versions). If the client and the server have the same data facet, then the communication may proceed normally. In the scenario where the client has a derived type (e.g., EuropeanCustomer), that derives from the Customer data type, the present invention facilitates the client communicating to the server that it is exchanging EuropeanCustomer instance data rather than Customer instance data and that the server should ignore the additional fields defined by the EuropeanCustomer data type if the server does not have the EuropeanCustomer data type available.

The present invention also facilitates a client and a server having different behavior facets. For example, a client can interact with a server using an "IBookSeller" interface that is a different version than the IBookSeller interface implemented by the server. Proxy refinement facilitates the client loading only the types actually needed by the client. For example, if the server type CBookSeller implements the IBookSeller and IBookRecommendationService interfaces. If the client is interacting with the server using only the IBookSeller interface, then the CBookSeller and IBookRecommendationService types are not loaded into the client process by the proxy infrastructure, providing advantages over conventional systems that would load the unnecessary interfaces.

The present invention relates to a system and method for facilitating interactions between entities (e.g., clients and servers) where the entities have mismatched data types, and where the data types may be incrementally extensible. In distributed object systems, where a common type system may be employed, data types may be represented by objects. Thus, data types may include data aspects (e.g., attributes, fields, properties), behavior aspects (e.g., methods) and metadata (e.g., data describing the data type).

A common type system may provide processes running on the platform that supports the common type system with a base set of types and mechanisms for extending those types and other application defined types. Thus, it is common that users of a common type system extend data types, which can lead to mismatches between client data types and server data types. Furthermore, a common type system may provide entities that interact with a data type the ability to gather information about the data type (e.g., implemented operators, implemented fields, versions, etc.). Conventionally, when a client and a server have mismatched data types, the client and server cannot interact on that data type. The present invention facilitates determining whether there is a mismatched data type and further, although there is a mismatched data type, whether there is common ground (e.g., common data and/or behavior aspects) that will allow the client and the server to interact on the data type. For example, a client may extend a base class data type found on a server, while the base class data type on the server remains unchanged. Thus, although the client and server have mismatched data types, they may have in common base class aspects that have not been overridden, and thus interaction on those common base class aspects may be possible.

A distributed object system employs proxies to image objects. By way of illustration, a client may create a first proxy to image a first server-based object. Later, the client may desire to employ the first proxy to image a second server-based object. Converting the proxy from a proxy that can image the first object to a proxy that can image the second object may involve casting the data type of the proxy. Conventionally, such casting may involve automatically loading substantially all of a data type (e.g., attributes, methods, metadata) associated with the second object even if the proxy will only communicate with the server object using a subset of the data and/or behavior in the data type. Such conventional automatic loading may cause the reloading of one or more portions of a data type and/or may cause the loading of unnecessary items. Thus, the present invention facilitates loading only the portions of a data type required to allow the proxy to be employed with a second object. This trait shall be referred to as incremental extensibility of a data type. Furthermore, although it is possible that a second object may require a set of attributes and/or methods, pre-loading the entire set may consume computing resources (e.g., time, memory) that can be avoided if the attributes and/or methods that are required are loaded on an as-needed basis (e.g., when actually encountered in processing associated with the second object).

In accordance with an aspect of the present invention, a system for facilitating interactions between a first entity and a second entity, where the entities have a mismatched data type, is provided. The system includes a data type identifier that can identify whether the first entity and the second entity have a mismatched resolvable data type and a data type resolver that can resolve interactions between the first entity and the second entity by resolving the mismatched data type. In one example of the present invention, the entities are a client and a server and the features include data and behavior. The metadata associated with the resolvable data type can be employed to identify the attributes and the methods in the resolvable data type, which may be associated with a proxy and which may be incrementally extensible on an as-needed basis.

Another aspect of the present invention provides a computer readable medium containing computer executable components for a system for facilitating interactions between two or more entities, where the entities have a mismatched data type. The components include a data type identifying component that can identify whether the first entity and the second entity have a mismatched resolvable data type and a data type resolving component that can resolve interactions between the first entity and the second entity by resolving the mismatched data type.

Yet another aspect of the present invention provides a method for facilitating interactions between two or more entities, where the entities have a mismatched data type. The method includes comparing a first object of a first data type to a second object of a second data type to determine features common to the data types. The method further includes creating a third object of a third data type, where the third data type includes features common to the mismatched data types. In one example of the method, the entities are a client and a server, and the first data type is associated with a proxy and is incrementally extensible on an as-needed basis.

Another aspect of the present invention provides a computer readable medium containing computer executable instructions for performing the method described immediately above.

Still another aspect of the present invention provides a data packet adapted to be transmitted between two or more computer processes where the data packet includes a first field containing information concerning attributes associated with a first data type, where the first data type is adapted to be incrementally extensible on an as-needed basis; and a second field containing information concerning methods associated with the first data type.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Prior Art

DETAILED DESCRIPTION OF THE INVENTION

Figure 1:
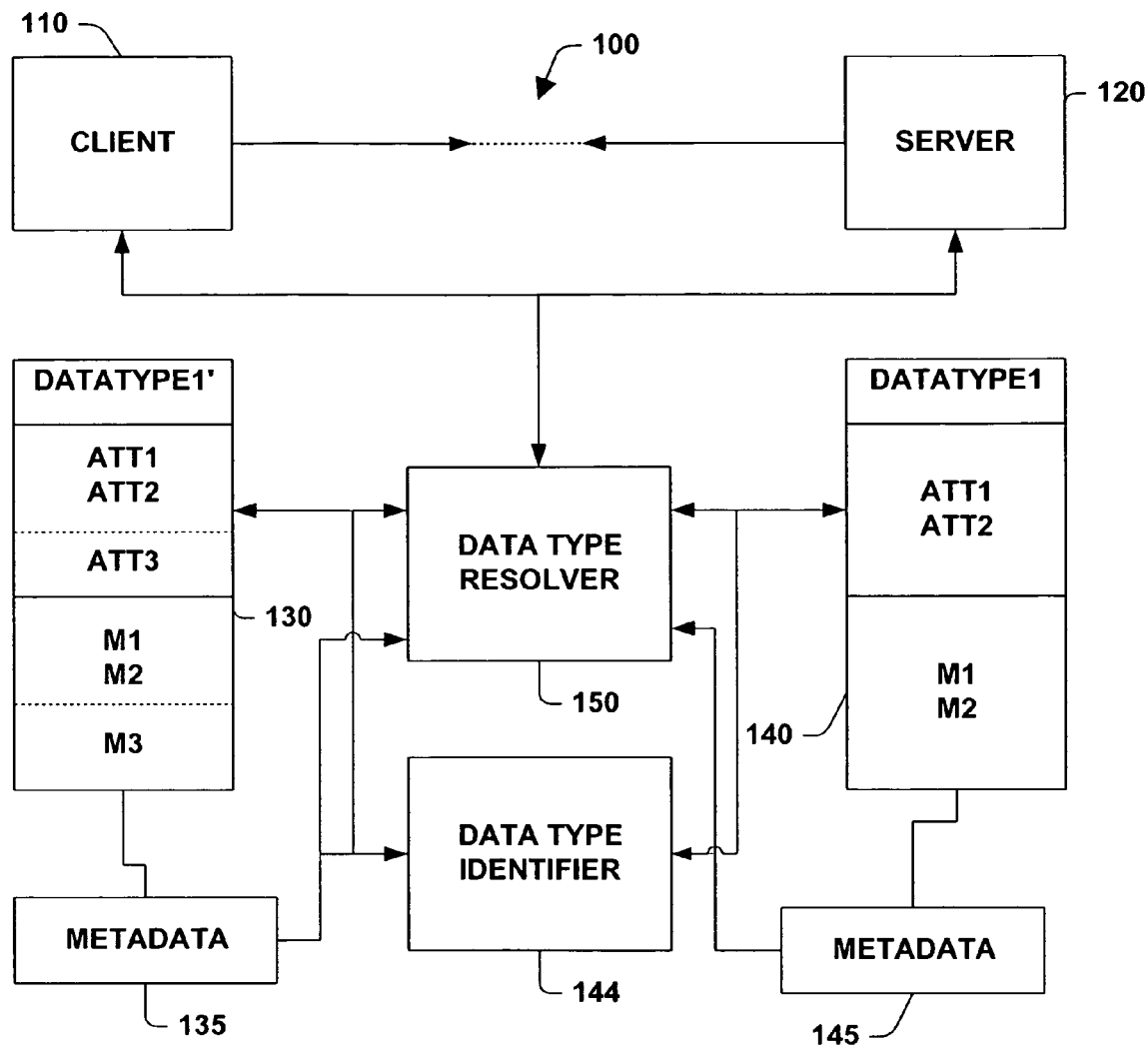
FIG. 1 is a schematic block diagram illustrating a system for providing version resiliency and incremental extensibility, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

As used in this application, the term "entity" is intended to refer to a computer-related entity, either hardware, a combination of hardware and software, software, or software in execution. For example, an entity may be, but is not limited to being, a process running on a processor, a processor, an object, an executable, a thread of execution, a program, a computer, a client and/or a server.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

Referring initially to FIG. 1 a distributed object system where interaction between a client 110 and a server 120 with inconsistent data types is facilitated by a data type identifier 144 and a data type resolver 150 is illustrated. The server 120 implements a first data type 140 that includes two attributes (e.g., ATT1, ATT2) and two methods (e.g., M1, M2). There is metadata 145 associated with the first data type 140. The client 110 implements a second data type 130, which is a different version of the first data type 140. The second data type 130 includes the two attributes (e.g., ATT1, ATT2) from the first data type 140, and the two methods (e.g., M1, M2) from the first data type 140. But the second data type 130 also includes a third attribute (e.g., ATT3) and a third method (e.g., M3). Thus, the first data type 140 and the second data type 130 do not match. The two data types have a data aspect mismatch (e.g., different number of attributes) and a behavior aspect mismatch (e.g., different number of methods, overridden methods). However, there is metadata 135 associated with the second data type 130, and the metadata 135 can describe the second data type 130, including a description of its attributes, its methods and which data type, if any, the server 120 should employ to interact with the second data type 130 if the server 120 does not have the definition of the second data type 130 available.

The data type identifier 144 can examine the first data type 140 and its related metadata 145 and the second data type 130 and its related metadata 135 to determine whether the two data types are mismatched. If the data types are resolvable and mismatched, then the data type resolver 150 can be employed to determine whether they are related (e.g., in an inheritance hierarchy) in a manner that will facilitate creating an object that spans the common ground between the two data types. In one example of the present invention, the extensions to the first data type 140 that were added to form the second data type 130 are ignored, and interaction is permitted on the common attributes and/or methods between the mismatched data types. In this way, version resiliency is achieved and problems associated with mismatched data types in conventional systems are mitigated.

Ignoring the additional attributes and methods is simplified in a situation where the interaction between the client 110 and the server 120 involves marshalling the proxy of the second data type 130 on the client 110 by value. When such marshalling by value is employed, the data type resolver 150 may create an object of the first data type 140 by picking out attribute values from the proxy of the second data type 130 and populating the corresponding attributes in the object of the first data type 140.

Ignoring the additional methods is complicated in a situation where the interaction between the client 110 and the server 120 involves marshalling by reference the proxy of the second data type 130 on the client 110. When such marshalling by reference is employed, the data type resolver 150 may create an object of the first data type 140 by picking out attribute values from the proxy of the second data type 130 and populating the corresponding attributes in the object of the first data type 140 and by further picking out method links (e.g., entry point addresses) from the proxy of the second data type 130 and populating the corresponding method links in the object of the first data type 140.

By way of illustration and not limitation, if the first data type 140 has nine attributes, and if the second data type 130 has ten attributes that are the nine attributes of the first data type 140 and an additional attribute, then the data type resolver 150 may facilitate interactions on the first data type 140 and the second data type 130 by restricting such interactions to the nine common attributes. Such restriction may be facilitated by the metadata 135 associated with the second data type 130. Thus, at 100, rather than the interaction between the client 110 and the server 120 failing as in conventional systems, limited communications are achieved.

By way of further illustration and not limitation, if the first data type 140 has five methods, and the second data type 130 has six methods that are four of the methods of the first data type 140, one of the methods of the first data type 140 that has been overridden, and an additional method, then the data type resolver 150 may facilitate communications on the first data type 140 and the second data type 130 by restricting such communication to the four common methods. Such restriction may be facilitated by examining the metadata 135 associated with the second data type 130. Thus, at 100, rather than the communication between the client 110 and the server 120 failing as in conventional systems, limited interactions are achieved.

Figure 2:
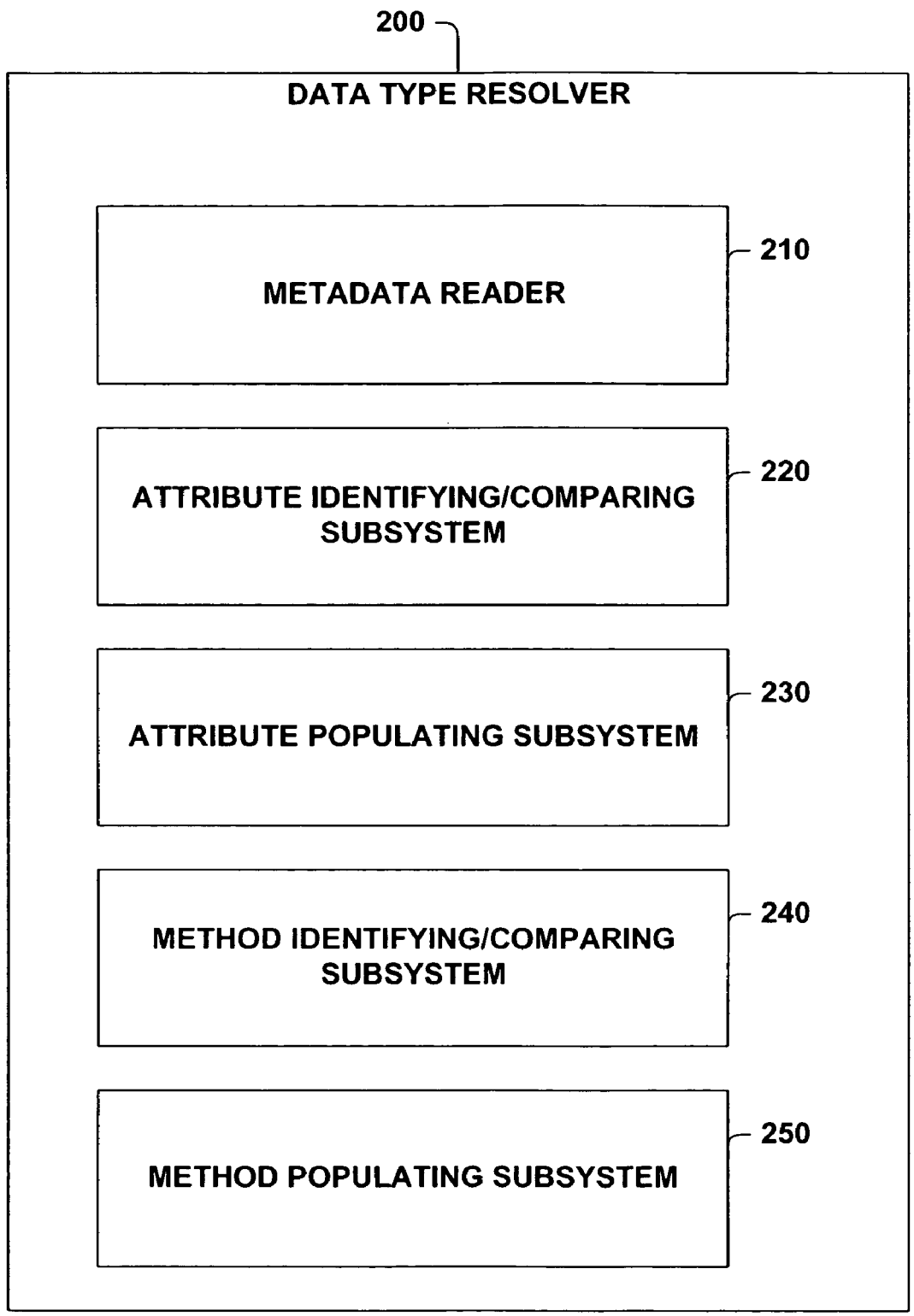
FIG. 2 is a schematic block diagram illustrating a data type resolver that facilitates providing version resiliency and incremental extensibility, in accordance with an aspect of the present invention.

Turning now to FIG. 2, a data type resolver 200 that facilitates providing version resiliency and incremental extensibility is illustrated. The data type resolver 200 can include one or more subsystems (e.g., a metadata reader 210, an attribute identifying/comparing subsystem 220, an attribute populating subsystem 230, a method identifying/comparing subsystem 240 and a method populating subsystem 250) to facilitate the version resiliency and incremental extensibility provided by the data type resolver 200.

The metadata reader 210 can take as inputs one or more pieces of metadata associated with one or more data types that are to be resolved. For example, the metadata 135 (FIG. 1) may be input to the metadata reader 210. The metadata may contain information including, but not limited to, a list of attributes in a data type associated with the metadata (where the list includes attribute names, types, sizes etc.), a list of methods in a data type associated with the metadata (where the list includes method names, parameter types, parameter sizes, method sizes, method entry addresses etc.), a list of interfaces implemented by a data type (where an interface may include one or more methods) and information identifying one or more classes that may be employed to interact with the data type if the entity with which an interaction is desired does not have the definition of the data type (e.g., a parent class) available. While the metadata information is described above in terms of a list, it is to be appreciated that other data structures may be employed in accordance with an aspect of the present invention. For example, data structures including, but not limited to, an array, a list, a heap, a stack, a table, a database record, a database table, a database and a data cube may be employed in accordance with the present invention. The information identifying one or more classes that may be employed to interact with the data type can be employed to determine whether a first data type is related to (e.g., is derived from, inherits from, is in the same inheritance tree as) a second data type. For example, a server may implement a first data type (e.g., customer), while a client may implement a second data type (e.g., American customer) that inherits from the server data type and which also extends the server type (e.g., adds attributes, adds methods). Thus, the second data type may include in its metadata information identifying the base class from which the second data type inherited, which facilitates the data resolver 200 identifying a data type upon which an interaction may occur even though the first data type and the second data type are mismatched. The metadata reader 210 is operably linked to the attribute identifying/comparing subsystem 220 and the method identifying/comparing subsystem 240, to facilitate those subsystems identifying and/or comparing mismatched data types.

The attribute identifying/comparing subsystem 220 can examine first attribute information associated with a first data type and second attribute information associated with a second data type to determine whether there are common attributes and if so, to identify such common attributes. The attribute identifying/comparing subsystem 220 can also examine first attribute information associated with a first data type and second attribute information associated with a second data type to determine whether there are dissimilar attributes and if so, to identify such dissimilar attributes. Such comparison and identification facilitates interactions between objects with mismatched data types. By way of illustration and not limitation, if the attribute identifying/comparing subsystem 220 compares attribute information associated with two data types and determines that the attribute information is identical, then the data type resolver 200 may permit marshal by value interactions without requiring manipulation of the data types. By way of further illustration and not limitation, if the attribute identifying/comparing subsystem 220 compares attribute information associated with two data types and determines that the attribute information is not identical, and that there is no overlap between the attribute information, then the data type resolver 200 may not permit interactions, and may throw an exception concerning the desired interaction. By way of still further illustration, if the attribute identifying/comparing subsystem 220 compares the attribute information associated with two data types and determines that the attribute information is not identical, but that there is overlap between the two data type attributes, then the data type resolver 200 may permit marshal by value interactions on the overlapping attributes and/or may throw an exception. Thus, the data type resolver 200 mitigates problems associated with data types with mismatched attributes being unable to interact by employing the attribute identifying/comparing subsystem 220.

The attribute identifying/comparing subsystem 220 is operably connected to the attribute populating subsystem 230. Once the data type resolver 200, via the attribute identifying/comparing subsystem 220, has determined that interaction between two data types is possible (e.g., identical data types, overlapping data types), then the attribute populating subsystem 230 can be employed to retrieve values from attributes of an object of a first data type and to populate attributes of an object of a second and/or third data type with the retrieved values.

By way of illustration, a server may implement a first data type (e.g., customer), while a client may implement a second data type (e.g., American customer) that inherits from the server data type and which also extends the server type (e.g., adds attributes). In such a situation, the data type resolver 200 may permit interactions between an instance of the American customer object and an instance of the server customer object via a server instance of a customer object, and the attributes of the server customer object may be populated with values retrieved from the client instance of the American customer object. By way of further illustration, a server may implement a first server data type (e.g., customer), while a first client may implement a first client data type (e.g., American customer) that inherits from the server data type and which also extends the server data type (e.g., adds attributes). A second client may implement a second client data type (e.g., European customer) that similarly inherits from the server data type and which similarly extends the server data type (e.g., adds attributes) but extends the server data type in a different manner than the first client data type. In such a situation, the data type resolver 200 may permit interactions between an entity employing the American customer type and an entity employing the European customer type via a server instance of a customer object, and the attributes of the customer object may be populated with values retrieved from the client instances of the American customer object and/or the European customer object.

Analogously to the attribute identifying/comparing subsystem 220, the method identifying/comparing subsystem 240 can examine first method information associated with a first data type and second method information associated with a second data type to determine whether there are common methods and if so, to identify such common methods. The method identifying/comparing subsystem 240 can also examine first method information associated with a first data type and second method information associated with a second data type to determine whether there are dissimilar methods and if so, to identify such dissimilar methods. Such comparison and identification facilitates interactions between objects with mismatched data types. By way of illustration and not limitation, if the method identifying/comparing subsystem 240 compares method information associated with two data types and determines that the method information is identical, then the data type resolver 200 may permit marshal by reference interactions without requiring manipulation of the data types. By way of further illustration and not limitation, if the method identifying/comparing subsystem 240 compares method information associated with two data types and determines that the method information is not identical, and that there is no overlap between the method information, then the data type resolver 200 may not permit interactions, and may throw an exception concerning the desired interaction. By way of still further illustration, if the method identifying/comparing subsystem 240 compares the method information associated with two data types and determines that the method information is not identical, but that there is overlap between the two data type methods, then the data type resolver 200 may permit marshal by reference interactions on the overlapping methods and/or may throw an exception. Thus, the data type resolver 200 mitigates problems associated with data types with mismatched methods being unable to interact by employing the method identifying/comparing subsystem 240.

Figure 14:
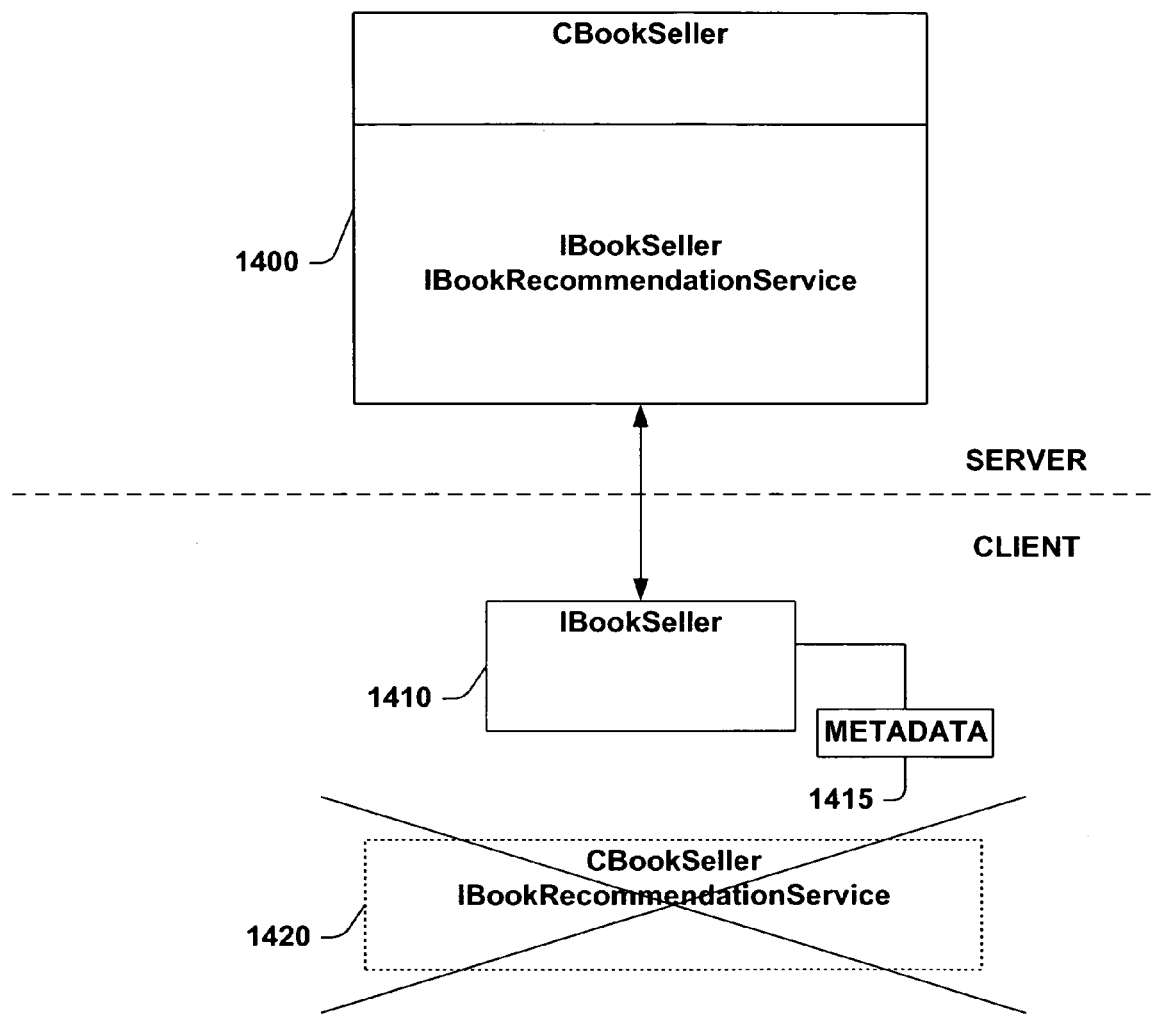
FIG. 14 is a schematic block diagram illustrating a client and a server with mismatched behavior aspects.

By way of further illustration, referring momentarily to FIG. 14, the present invention facilitates interactions between a client 1410 and a server 1400 having different behavior facets. For example, the client 1410 can interact with the server 1400 using an IBookSeller interface that is a different version than the IBookSeller interface implemented by the server 1400. Proxy refinement facilitates the client 1410 loading only the types actually needed by the client 1410. Thus, if the server 1400 CBookSeller type implements the IBookSeller and IBookRecommendationService interfaces and the client 1410 is interacting with the server 1400 using only the IBookSeller interface, then the CBookSeller and IBookRecommendationService types 1420 are not loaded into the client 1410 process by the proxy infrastructure, providing advantages over conventional systems that would load the unnecessary interfaces.

Returning now to FIG. 2, the method identifying/comparing subsystem 240 is operably connected to the method populating subsystem 250. Once the data type resolver 200, via the method identifying/comparing subsystem 240, has determined that interaction between two data types is possible (e.g., identical data types, overlapping data types), then the method populating subsystem 250 can be employed to retrieve method entry points, for example, from an object of a first data type and to populate method entry points of an object of a second and/or third data type with the retrieved entry points.

By way of illustration, a server may implement a first data type (e.g., customer), while a client may implement a second data type (e.g., American customer) that inherits from the server data type and which also extends the server type (e.g., adds methods). In such a situation, the data type resolver 200 may permit interactions between an instance of the American customer object and an instance of the server customer object via a server instance of a customer object, and the methods of the server customer object may be populated with entry points retrieved from the client instance of the American customer object. By way of further illustration, a server may implement a first server data type (e.g., customer), while a first client may implement a first client data type (e.g., American customer) that inherits from the server data type and which also extends the server data type (e.g., adds methods). A second client may implement a second client data type (e.g., European customer) that similarly inherits from the server data type and which similarly extends the server data type (e.g., adds methods) but which extends the server data type in a different manner than the first client data type. In such a situation, the data type resolver 200 may permit interactions between an entity employing the American customer type and an entity employing the European customer type via a server instance of a customer object, and the method entry points of the customer object may be populated with entry points retrieved from the client instances of the American customer object and/or the European customer object.

Figure 3:
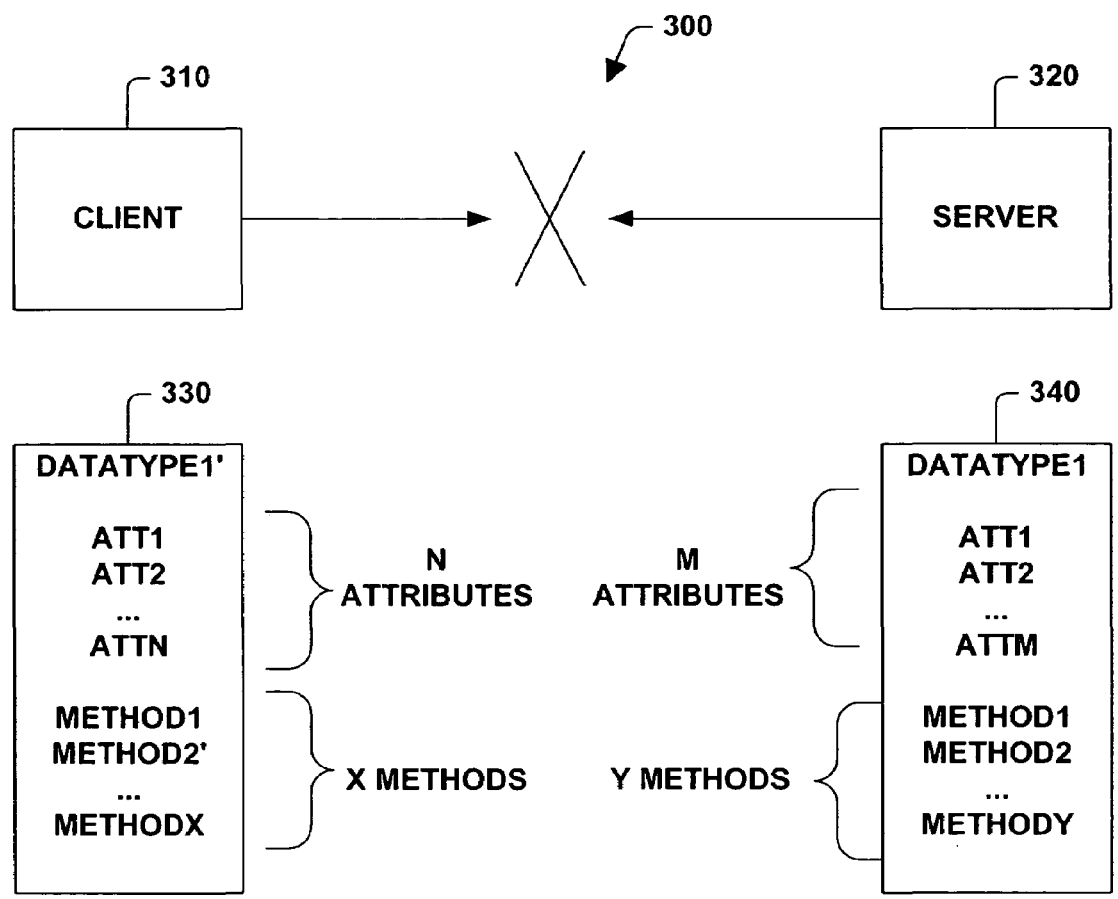
FIG. 3 is a schematic block diagram illustrating a conventional distributed object system where interactions are hampered by inconsistent data types between a client and a server.

Prior Art FIG. 3 is a schematic block diagram illustrating a conventional distributed object system where interactions are hampered by inconsistent data types between a client 310 and a server 320. The server 320 implements a first data type 340 that includes M attributes and Y methods, M and Y being integers. The client 310 implements a second data type 330, which is a different version of the first data type 340.

The second data type 330 includes N attributes and X methods, where N and X are integers, and N does not equal M and X may or may not equal Y. The second data type 330 includes a method METHOD2' that overrides a method METHOD2 in the first data type 340. Thus, the first data type 340 and the second data type 330 do not match. The two data types have a data aspect mismatch (e.g., different number of attributes) and a behavior aspect mismatch (e.g., different number of methods, overridden methods).

In the conventional system illustrated in Prior Art FIG. 3, the client 310 and server 320 will not be able to interact on the mismatched data type, and thus, at 300, the interaction between the client 310 and the server 320 will fail.

Figure 4:
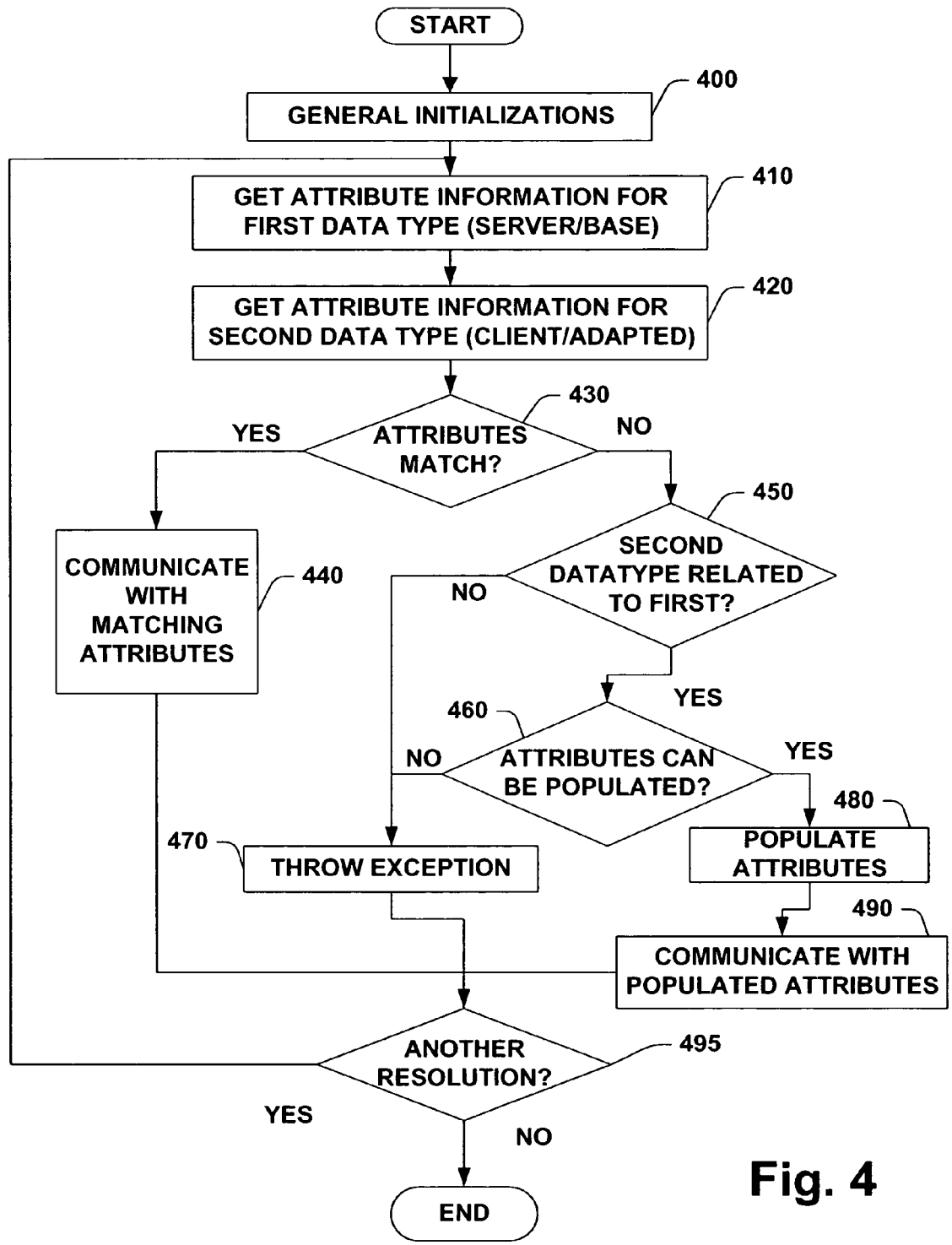
FIG. 4 is a flow chart illustrating a method for resolving attribute mismatches between data types, in accordance with an aspect of the present invention.
Figure 5:
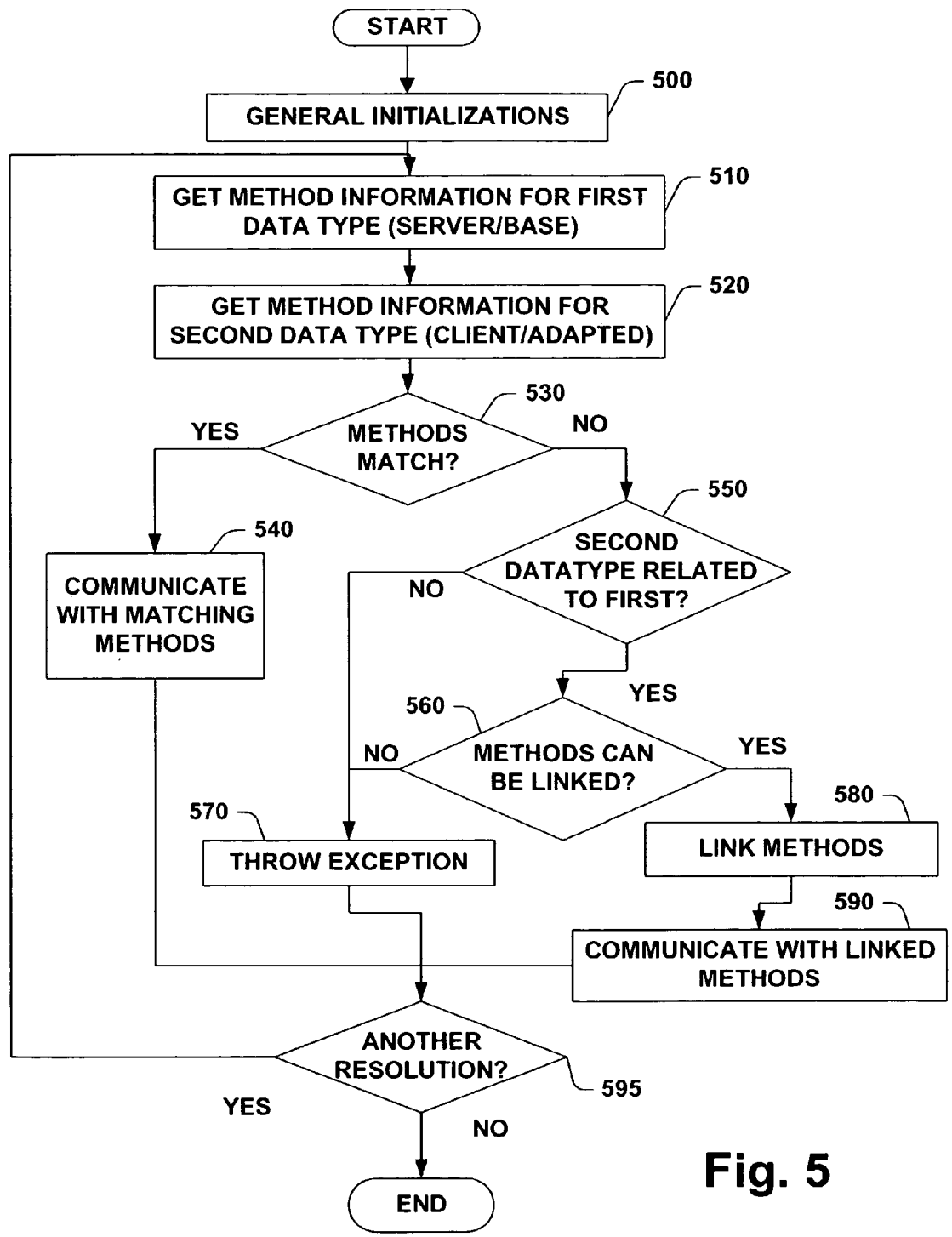
FIG. 5 is a flow chart illustrating a method for resolving method mismatches between data types, in accordance with an aspect of the present invention.
Figure 7:
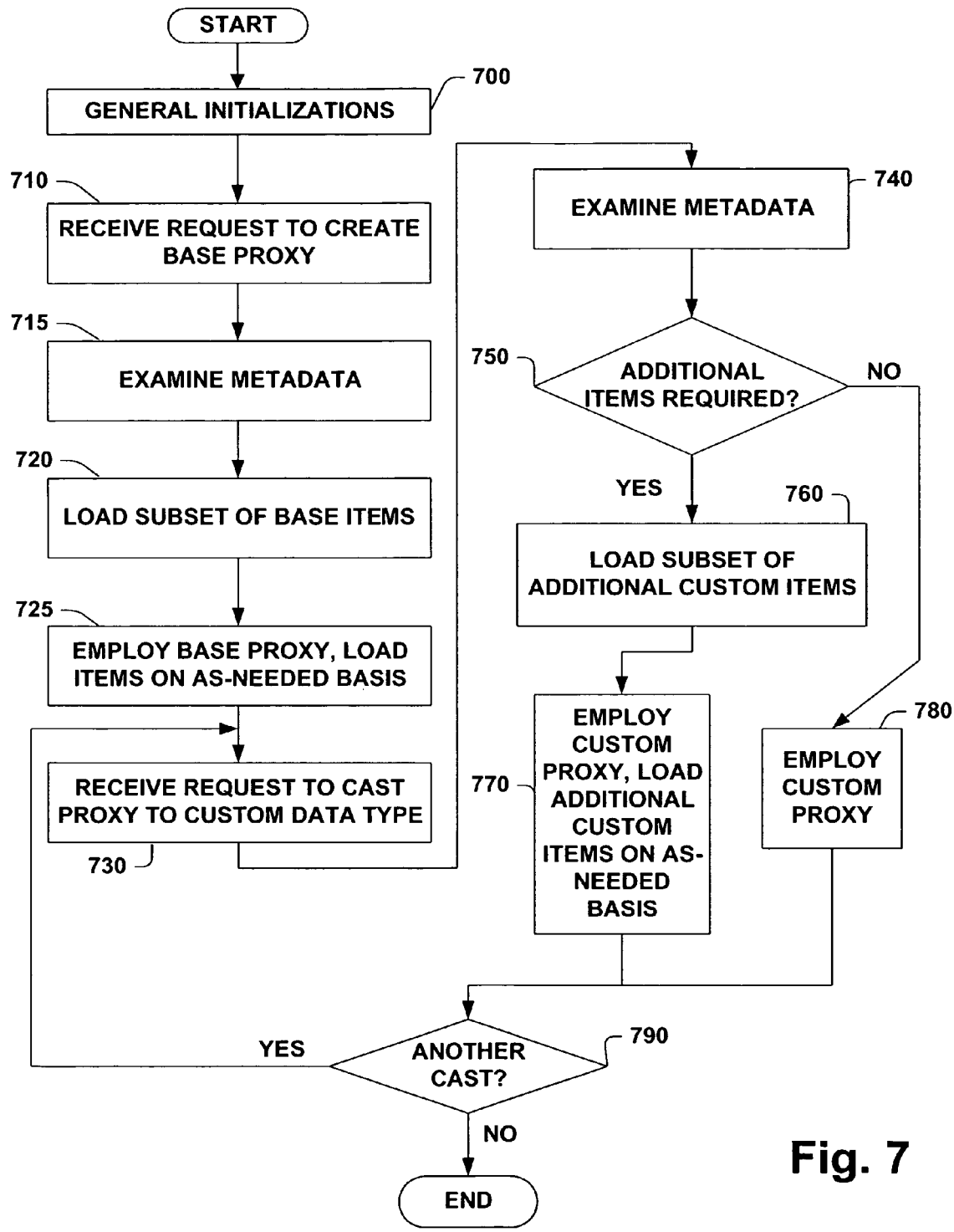
FIG. 7 is a flow chart illustrating a method for incrementally extending a proxy on an as-needed basis, in accordance with an aspect of the present invention.

In view of the exemplary systems shown and described above, methodologies, which may be implemented in accordance with the present invention, will be better appreciated with reference to the flow charts of FIGS. 4, 5 and 7. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

FIG. 4 illustrates a method for resolving attribute mismatches between data types. At 400, general initializations occur. Such initializations include, but are not limited to, allocating memory, establishing pointers, establishing data communications, acquiring resources, instantiating objects and setting initial values for variables.

At 410, attribute information associated with a first data type (e.g., a server data type, a base class data type) is acquired. Acquiring such attribute information may involve examining metadata associated with the first data type and/or invoking one or more reflection methods, for example. The metadata may contain information including, but not limited to, a list of attributes associated with the first data type (where the list includes attribute names, types, sizes etc.), a list of methods associated with the first data type (where the list includes method names, parameter types, parameter sizes, method sizes, method entry addresses etc.), a list of interfaces implemented by the first data type (where an interface may include one or more methods) and information identifying one or more classes that may be employed to interact with the first data type if the entity with which an interaction is desired does not have the definition of the first data type. While the attribute information is described above in terms of a list, it is to be appreciated that other data structures may be employed in accordance with an aspect of the present invention. For example, data structures including, but not limited to, an array, a list, a heap, a stack, a table, a database record, a database table, a database and a data cube may be employed in accordance with the present invention.

At 420, attribute information associated with a second data type (e.g., a client data type, a derived data type) is acquired. Acquiring such attribute information may involve examining metadata associated with the second data type, where the format of the metadata is substantially similar to the metadata described in association with 410 and/or invoking one or more reflection methods, for example.

At 430, a determination is made concerning whether the attributes of 410 and the attributes of 420 match. If the determination at 430 is YES, then at 440, communication on objects of the first data type and the second data type may proceed without requiring the method to manipulate the data types to account for mismatched attributes. But if the determination at 430 is NO, then at 450, a determination is made concerning whether the first data type is related to the second data type. For example, metadata associated with the first data type and metadata associated with the second data type may be examined to determine matters including, but not limited to, whether the first data type is a base class from which the second data type inherited and whether the first data type and the second data type share a common ancestor in an inheritance hierarchy. If the determination at 450 is NO, that there is no relation between the two data types, then at 470 an exception will be thrown and the desired communication on the mismatched data types will not proceed.

If the determination at 450 is YES, that there is a relation between the two data types, then at 460 a determination is made concerning whether the attributes of an object to be employed to facilitate the interaction on the mismatched data type can be populated. By way of illustration, a determination may be made concerning whether attribute values from the object of the second data type (e.g., the client object) can be employed to populate attributes of an object of the first data type (e.g., the server object). If the determination at 460 is NO, then at 470 an exception is thrown and the desired communication on the mismatched data types will not proceed. While 470 indicates that an exception will be thrown, it is to be appreciated that throwing an exception is but one possible mechanism for informing the entity (e.g., process, program, machine) that desired to communicate on the mismatched data type that the desired communication will not proceed. For example, other mechanisms including, but not limited to, setting a flag value, clearing a flag value, generating an interrupt and halting a process may be employed by the present invention.

If the determination at 460 is YES, that the attributes can be populated, then at 480 the attributes are populated. For example, in a marshal by value situation, attribute values from an instance of a client object may be read and employed to establish attribute values in an instance of a server object that is to be employed to facilitate the interaction on the mismatched data types. At 490, the communication on the mismatched data type proceeds.

At 495, a determination is made concerning whether there is another resolution to perform. If the determination at 495 is NO, processing concludes, otherwise processing returns to 410.

FIG. 5 illustrates a method for resolving method mismatches between data types. At 500, general initializations occur. Such initializations include, but are not limited to, allocating memory, establishing pointers, establishing data communications, acquiring resources, setting initial values for variables and displaying process activity.

At 510, method information associated with a first data type (e.g., a server data type, a base class data type) is acquired. Acquiring such method information may involve examining metadata associated with the first data type and/or invoking one or more reflection methods, for example. The metadata may contain information including, but not limited to, a list of attributes associated with the first data type (where the list includes attribute names, types, sizes etc.), a list of methods associated with the first data type (where the list includes method names, parameter types, parameter sizes, method sizes, method entry addresses etc.), a list of interfaces implemented by the first data type (where an interface may include one or more methods) and information identifying one or more classes that may be employed to interact with the first data type if the entity with which an interaction is desired does not have the definition of the first data type. While the method information is described above in terms of a list, it is to be appreciated that other data structures may be employed in accordance with an aspect of the present invention. For example, data structures including, but not limited to, an array, a list, a heap, a stack, a table, a database record, a database table, a database and a data cube may be employed in accordance with the present invention.

At 520, method information associated with a second data type (e.g., a client data type, a derived data type) is acquired. Acquiring such method information may involve examining metadata associated with the second data type, where the metadata is substantially similar to the metadata described in association with 510 and/or invoking one or more reflection methods, for example.

At 530, a determination is made concerning whether the methods of 510 and the methods of 520 match. If the determination at 530 is YES, then at 540, communication between objects of the first data type and the second data type may proceed without requiring the method to manipulate the data types to account for mismatched methods. But if the determination at 530 is NO, then at 550, a determination is made concerning whether the first data type is related to the second data type. For example, metadata associated with the first data type and metadata associated with the second data type may be examined to determine matters including, but not limited to, whether the first data type is a base class from which the second data type inherited and whether the first data type and the second data type share a common ancestor in an inheritance hierarchy. If the determination at 550 is NO, that there is no relation between the two data types, then at 570 an exception will be thrown and the desired communication on the mismatched data types will not proceed.

If the determination at 550 is YES, that there is a relation between the two data types, then at 560 a determination is made concerning whether the methods of an object to be employed to facilitate the interaction on the mismatched data type can be populated. By way of illustration, a determination may be made concerning whether method values from the object of the second data type (e.g., the client object) can be employed to populate method values of an object of the first data type (e.g., the server object). If the determination at 560 is NO, then at 570 an exception is thrown and the desired communication on the mismatched data types will not proceed. While 570 indicates that an exception will be thrown, it is to be appreciated that throwing an exception is but one possible mechanism for informing the entity (e.g., process, program, machine) that desired to communicate on the mismatched data type that the desired communication will not proceed. For example, other mechanisms including, but not limited to, setting a flag value, clearing a flag value, generating an interrupt and halting a process may be employed by the present invention.

If the determination at 560 is YES, that the methods can be populated, then at 580 the methods are populated. For example, in a marshal by reference situation, method values from an instance of a client object may be read and employed to establish method values in an instance of a server object that is to be employed to facilitate the interaction on the mismatched data types. At 590, the communication on the mismatched data type proceeds.

At 595, a determination is made concerning whether there is another resolution to perform. If the determination at 595 is NO, processing concludes, otherwise processing returns to 510.

Although FIGS. 4 and 5 illustrate attribute and method matching being performed independently, it is to be appreciated that such attribute and method matching may be performed independently and/or collectively.

Figure 6:
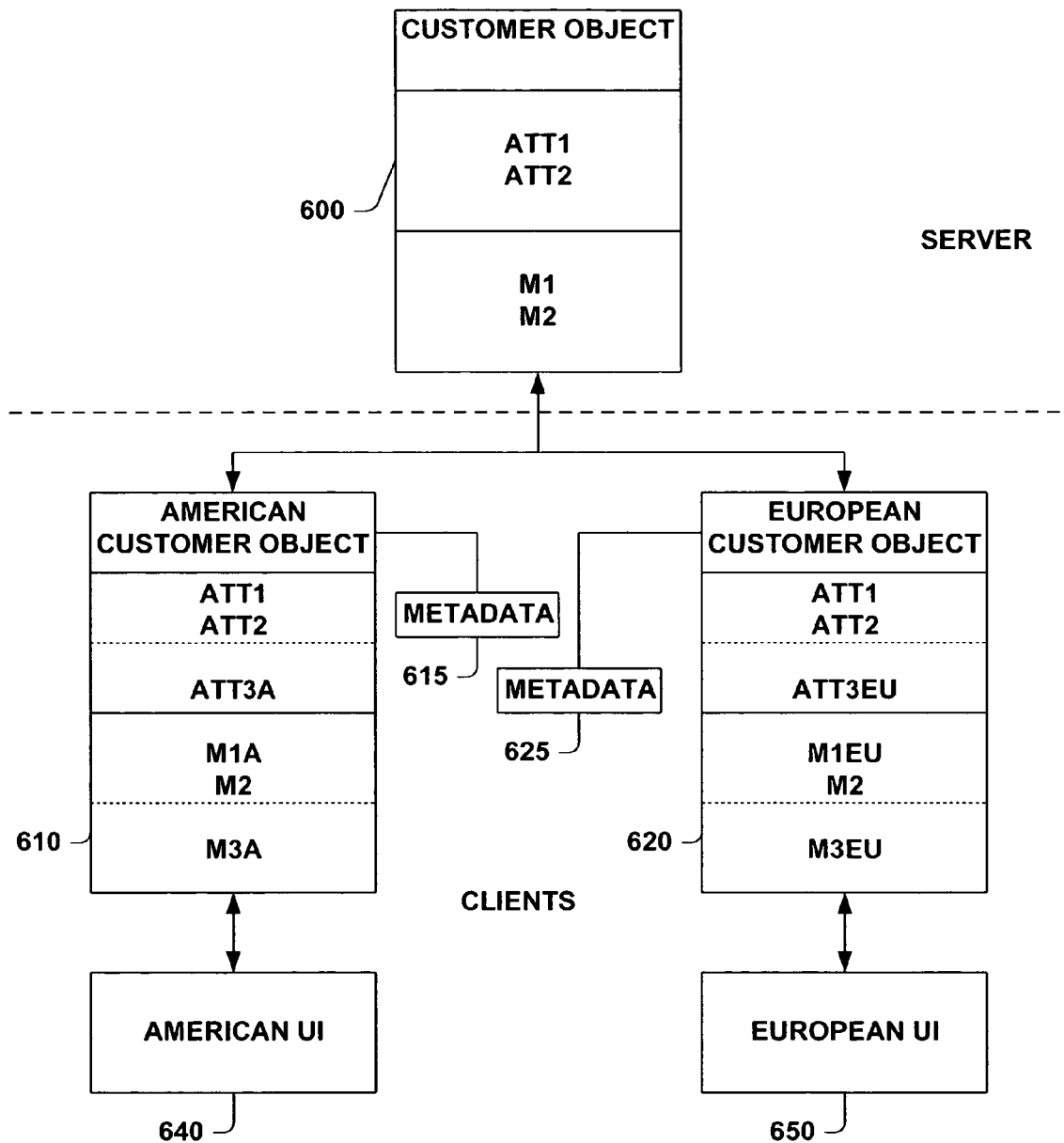
FIG. 6 is a schematic block diagram illustrating example data types that have become mismatched through the data type being extended on a client.

FIG. 6 illustrates an example server based data type 600 (e.g., customer), from which two example client data types (e.g., American customer 610, European customer 620) have been created. The example server based data type 600 has two attributes ATT1 and ATT2, although it is to be appreciated that base data types with a greater or lesser number of attributes may be employed in accordance with the present invention. The example server based data type 600 also has two methods M1 and M2, although it is to be appreciated that base data types with a greater or lesser number of methods may be employed in accordance with the present invention.

FIG. 6 also illustrates two client based data types, the American customer data type 610 and the European customer data type 620. The American customer data type 610 inherits from the customer data type 600 and thus has the two attributes ATT1 and ATT2 and has two methods M1A and M2. But the American customer data type 610 has added an additional attribute ATT3A, has overridden the method M1 as the method M1A and has added an additional method M3A. The additional method M3A may have been added to facilitate the American customer data type 610 interacting with an American user interface 640, for example. Thus, the logic contained in the method M3A is relevant to the American customer data type 610 but is not relevant to the customer data type 600. Therefore, although the American customer data type 610 is related to the customer data type 600 (it inherits from the customer data type 600), and although there is overlap between the American customer data type 610 and the customer data type 600, the data types are not identical.

The American customer data type 610 is associated with metadata 615. The metadata 615 may describe the American customer object by holding information including but not limited to, information describing the attributes, information describing the methods, information describing interfaces associated with the data type and information describing the data type from which the data type inherits.

By employing the present invention, interactions between objects of the customer data type 600 and objects of the American customer data type 610 are facilitated. By way of illustration, in a marshal by value situation, the metadata 615 may be examined to facilitate determining that the attribute ATT3A should be ignored by a server instance of a customer object 600 that could have its ATT1 value populated from the client instance of an American customer object and that could similarly have its ATT2 value populated from the client instance of an American customer object. By way of further illustration, in a marshal by reference situation, the metadata 615 may be employed to facilitate determining that the M3A method should be ignored by a server instance of a customer object 600 and that although the M1A method is related to the M1 method, that the M1A method should not be employed by the server instance of the customer object.

The European customer data type 620 also inherits from the customer data type 600 and thus has the two attributes ATT1 and ATT2 and has two methods M1EU and M2. But the European customer data type 620 has added an additional attribute ATT3EU, has overridden the method M1 as the method M1EU and has added an additional method M3EU. The additional method M3EU may have been added to facilitate the European customer data type 620 interacting with a European user interface 650, for example. Thus, the logic contained in the method M3EU is relevant to the European customer data type 620 but is not relevant to the customer data type 600. Therefore, although the European customer data type 620 is related to the customer data type 600 (it inherits from the customer data type 600), and although there is overlap between the European customer data type 620 and the customer data type 600, the data types are not identical.

The European customer data type 620 is associated with metadata 625. The metadata 625 may describe the European customer object by holding information including but not limited to, information describing the attributes, information describing the methods, information describing interfaces associated with the data type and information describing the data type from which the data type inherits.

By employing the present invention, interactions between objects of the customer data type 600 and objects of the European customer data type 620 are facilitated. By way of illustration, in a marshal by value situation, the metadata 625 may be employed to facilitate determining that the attribute ATT3EU should be ignored by a server instance of a customer object 600 that could have its ATT1 value populated from the client instance of an European customer object and that could similarly have its ATT2 value populated from the client instance of a European customer object. By way of further illustration, in a marshal by reference situation, the metadata 625 may be employed to facilitate determining that the M3EU method should be ignored by a server instance of a customer object 600 and that although the M1EU method is related to the M1 method, that the M1A method should not be employed by the server instance of the customer object.

FIG. 6 illustrates another interaction that may be facilitated by the present invention. Consider the case where an interaction is desired between an object of the American customer data type 610 and an object of the European customer data type 620. Conventionally such an interaction may not be possible. But by employing the present invention, a limited interaction between the American customer data type 610 and the European customer data type 620 may be possible. By way of illustration, the American customer data type 610 is associated with the metadata 615, which may contain information about the inheritance hierarchy in which the American customer data type 610 resides. Thus, the metadata may include information not only about the American customer data type 610 but also the customer data type 600, and the fact that the American customer data type 610 inherits from the customer data type 600. Similarly, the European customer data type 620 is associated with the metadata 625, which may contain information about the inheritance hierarchy in which the European customer data type 620 resides. Thus, the metadata may include information not only about the European customer data type 620 but also the customer data type 600, and the fact that the European customer data type 620 inherits from the customer data type 600. Given access to the metadata 615 and the metadata 625, the present invention may determine that there is an overlap between the American customer data type 610 and the European customer data type 620, where such overlap includes the attributes ATT1, ATT2 and the method M2. Thus, interactions between the American customer data type 610 and the European customer data type 620 may be permitted in that limited area of overlap, providing advantages over conventional systems.

Turning now to FIG. 7, a flow chart illustrates a method for incrementally extending a proxy on an as-needed basis. At 700, general initializations occur. Such initializations include, but are not limited to, allocating memory, establishing pointers, establishing data communications, acquiring resources, instantiating objects and setting initial values for variables.

At 710, a request to create a base proxy is received. The base proxy data type is a data type provided by a distributed object system. The distributed object system, through the base data type, provides access to distributed object system features and functionality (e.g., reflection, garbage collection, remoting). At 715, metadata associated with the base proxy data type is examined. The metadata may be employed to facilitate determining base proxy data type items (e.g., attributes, methods, constructors, interfaces) that are to be loaded into a client creating a base proxy. For example, a set of attributes, one or more constructor methods and one or more reflection methods may be identified. At 720, base proxy data type items (e.g., attributes, methods, interfaces) are loaded onto the client where the instance of the base proxy data type is being created. In one example of the present invention, only a subset of the set of base proxy data items are loaded, which may mitigate problems associated with the processing time required to load a base proxy data type and which may further mitigate problems associated with memory requirements for loading a base proxy data type.

At 725, the base proxy may be employed in client side processing. Such client side processing that employs a base proxy data type is conventionally performed by system level processes to perform tasks like, establishing data communication with a remote object, acquiring memory, and the like.

At 730, a request to cast the current proxy to a custom data type is received. For example, the proxy may currently be to a customer data type (see, e.g., FIG. 6) and a request to cast the proxy to an American customer data type (see, e.g., FIG. 6) may arrive. Thus, at 740, metadata associated with the custom type to which the proxy is to be cast can be examined. The examination at 740 may reveal additional items (e.g., attributes, methods) that are associated with the data type to which the proxy will be cast that are not associated with the data type with which the proxy is currently typed. Thus, at 750, a determination is made concerning whether additional items are required to be loaded into the client to support the data type to which the proxy is being cast. If the determination at 750 is NO, that no additional items are required, then at 780, the client may employ the custom proxy. The determination at 750 may be NO, if, for example, the proxy is being cast to an ancestor of a descendant data type. If the determination at 750 is YES, that additional items are required to support the new data type to which the proxy is being cast, then at 760 additional items are loaded into the client. In one example of the present invention, only a subset of the additional items are loaded into the client. In either case, the incremental extension of the proxy provides a proxy refinement method that is more efficient and flexible than conventional systems in that only items (e.g., attributes, methods, interfaces) that are necessary to interact with the cast proxy are loaded on an as-needed basis. Thus, improvements in processing time, memory requirements, and object to object interaction flexibility are achieved.

At 770, the custom proxy is employed in client side processing. During such processing, if only a subset of additional custom items was loaded at 760, additional custom items may be loaded on an as-needed basis. For example, although a custom data type may implement twenty methods, the metadata associated with the custom data type may indicate that only five of the twenty methods are typically invoked. Thus, at 760, only those five methods may have been loaded. If during processing at 770 one of the additional fifteen methods that was not loaded is encountered, then it can be loaded on a just in time fashion.

At 790, a determination is made concerning whether another cast is desired for the proxy. If the determination at 790 is YES, then processing can return to 730, otherwise processing may conclude.

Figure 8:
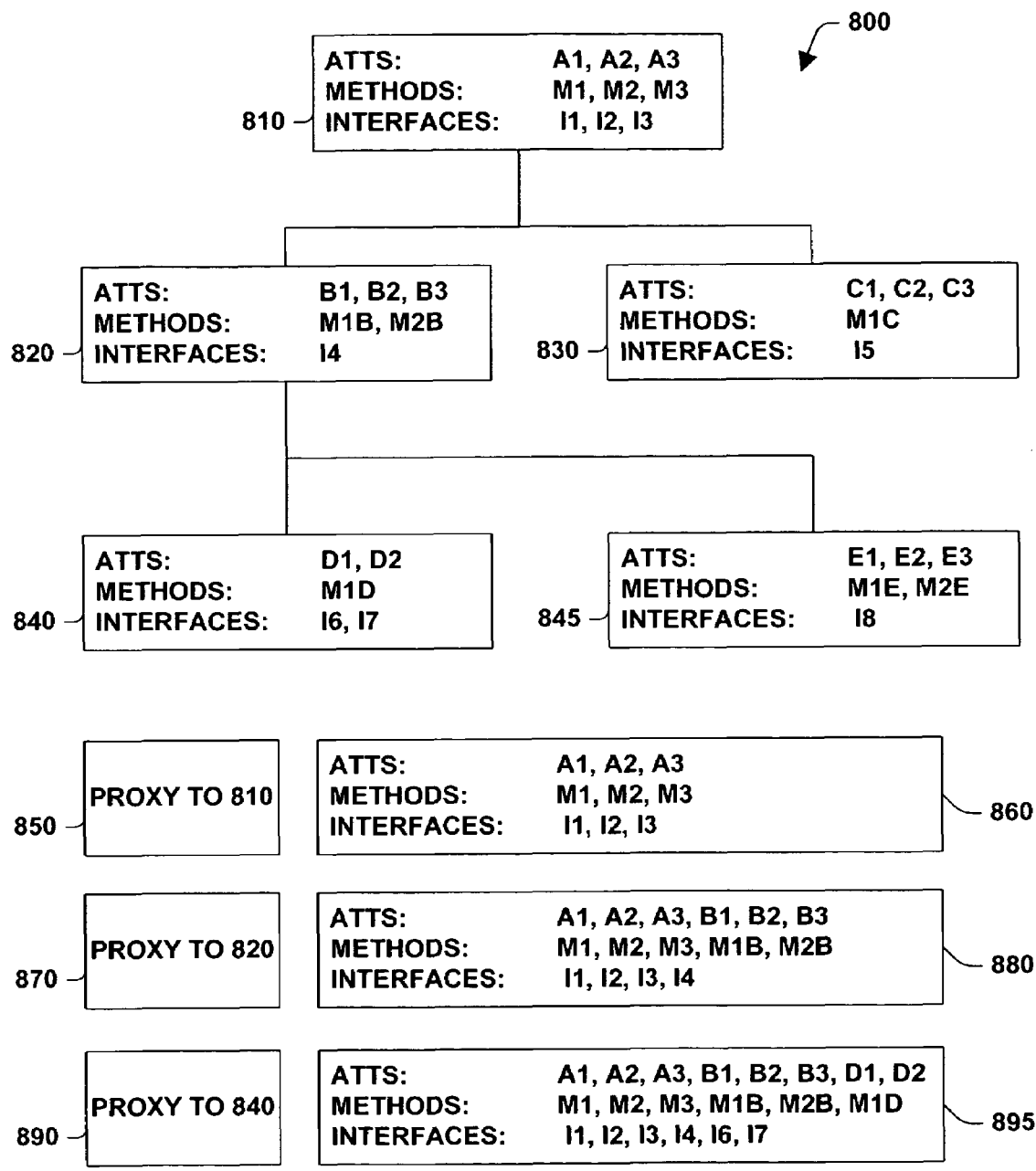
FIG. 8 illustrates a proxy being incrementally extended in accordance with an aspect of the present invention.
Figure 9:
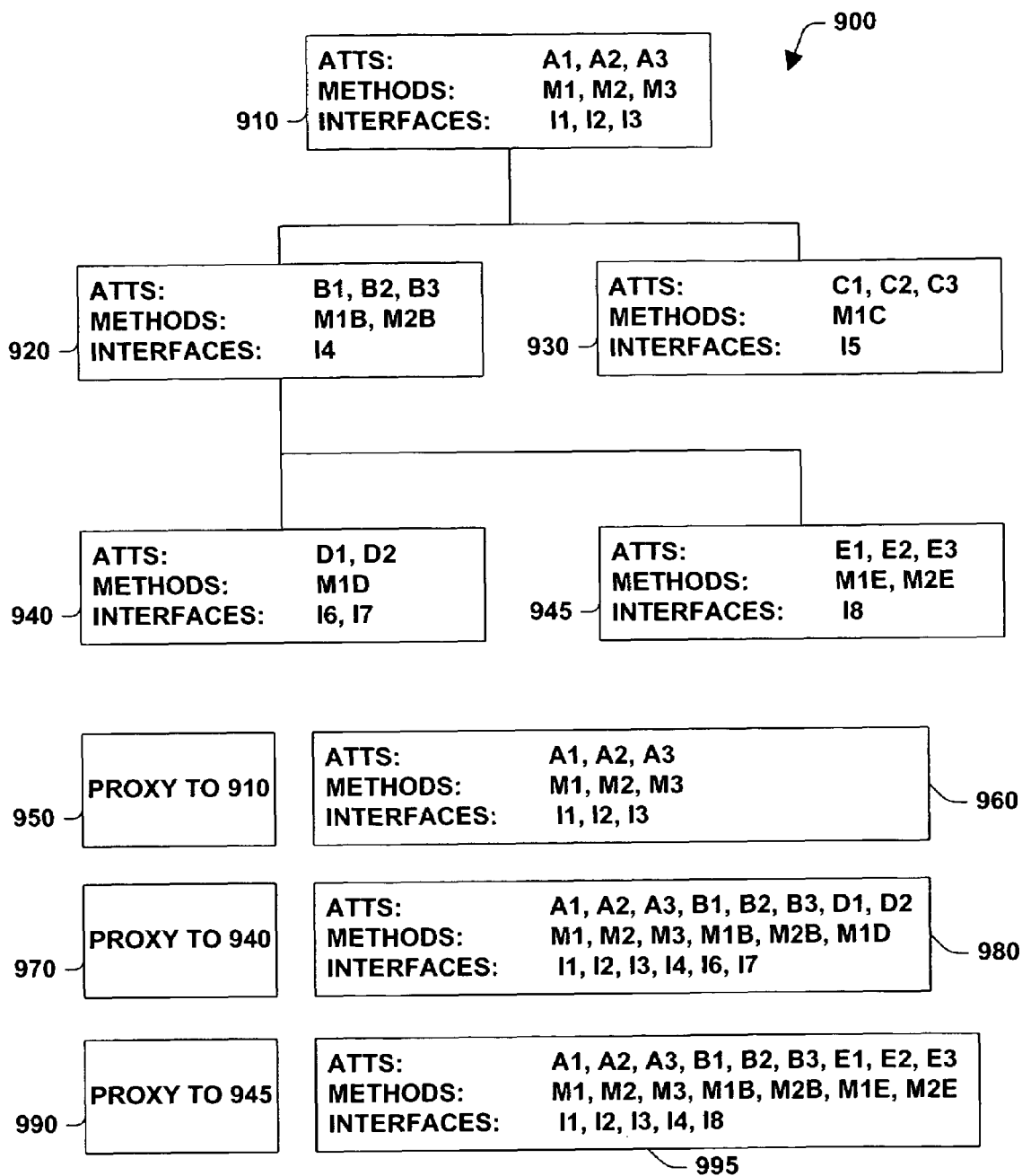
FIG. 9 illustrates a proxy being incrementally extended in accordance with an aspect of the present invention.
Figure 10:
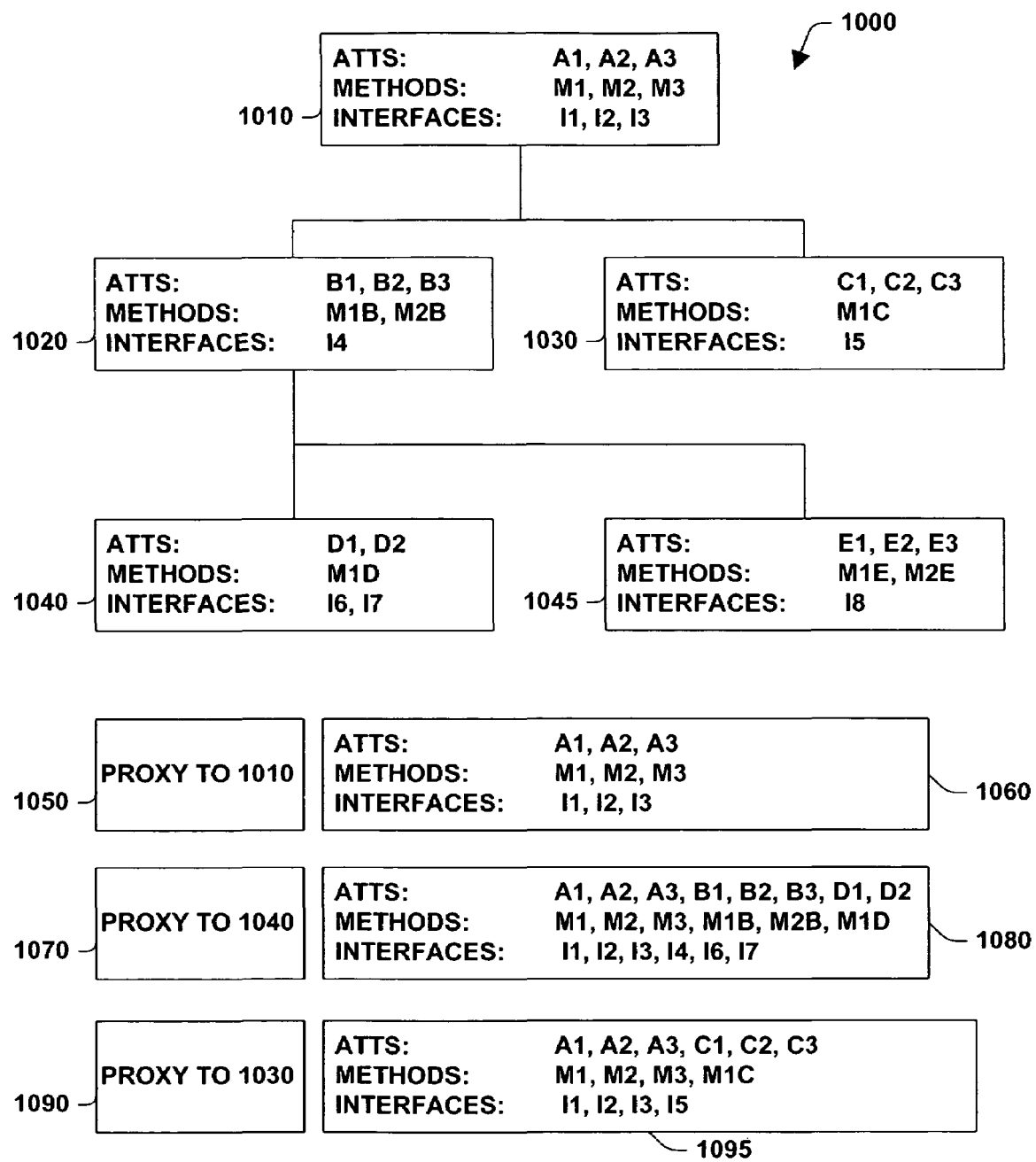
FIG. 10 illustrates a proxy being incrementally extended in accordance with an aspect of the present invention.
Figure 11:
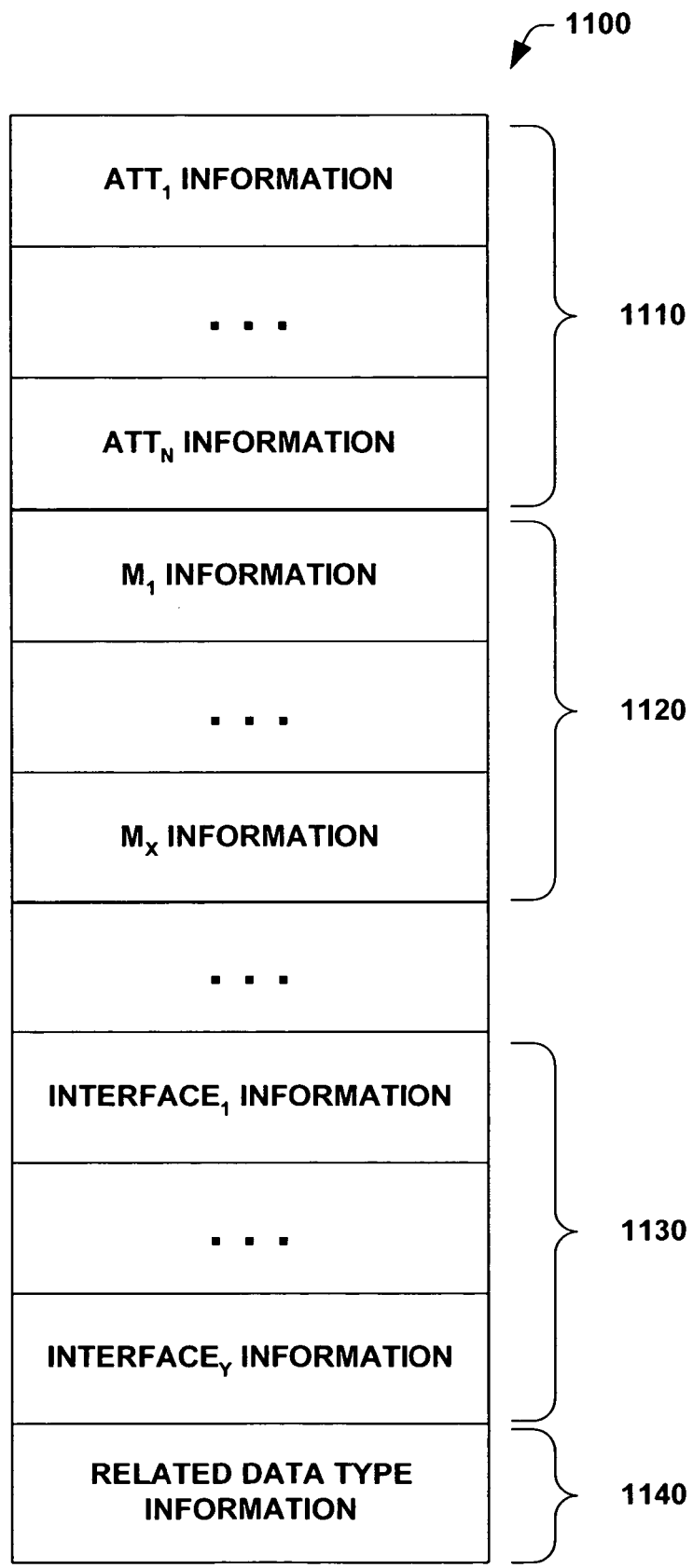
FIG. 11 illustrates a data packet adapted to be transmitted between computer processes, in accordance with an aspect of the present invention.

FIGS. 8, 9 and 10 illustrate a proxy being adapted through a method similar to the incremental refinement method described in association with FIG. 7. Thus, turning to FIG. 8, an inheritance hierarchy 800 is illustrated. The hierarchy has a base class 810 that includes the attributes A1, A2, A3, the methods M1, M2, M3 and the interfaces I1, I2 and I3. Two classes inherit directly from the base class 810. The class 820 inherits from the class 810 and adds the attributes B1, B2, B3, the methods M1B, M2B and the interface I4. Similarly, the class 830 inherits from the base class 810 and adds the attributes C1, C2, C3, the method M1C and the interface I5. In addition to the two classes that inherit directly from the base class 810, two classes inherit from the derived class 820. The class 840 derives from the derived class 820 and adds the attributes D1, D2, the method M1D and the interfaces I6 and I7. Similarly, the class 845 derives from the derived class 820 and adds the attributes E1, E2, E3, the methods M1E, M2E and the interface I8.

Given an inheritance hierarchy like the hierarchy 800, the present invention facilitates proxies asking the question of whether the proxy is of a certain type, and whether the client has all the items (e.g., attributes, methods, interfaces, metadata) required to act as a proxy for an object of a data type. Furthermore, the present invention facilitates incrementally refining a proxy and in one example performs the incremental proxy refinement on an as-needed basis.

By way of illustration, a first proxy 850 may be a proxy for an object of class 810. The present invention may identify the set of items required to support the proxy 850 as listed in block 860. Thus, the client will load items to support the proxy (e.g., attributes A1, A2, A3, methods M1, M2, M3, interfaces I1, I2 and I3, related metadata). In one example of the present invention, the items will all be loaded in association with initializing the proxy 850. In another example of the present invention, one or more of the items may not be loaded in association with initializing the proxy 850 and thus may be loaded later, on an as-needed basis.

At a later point in time, a request may arrive to cast the proxy 850 from a proxy for an object of class 810 to a proxy for an object of class 820. Thus, the present invention may examine metadata and/or invoke one or more reflection methods, for example, to determine whether the class 810 and the class 820 are related, and if so, what, if any, additional items are required to load into the client to facilitate the proxy 870 serving as a proxy to an object of class 820. In FIG. 8, the class 820 and the class 810 are related in an ancestor/descendant manner in the inheritance hierarchy 800. The present invention is thus able to determine that in addition to the items currently loaded for the proxy 850, additional items are required to be loaded for the proxy 870. The present invention may identify the set of items required to support the proxy 870 as listed in block 880. Thus, the attributes B1, B2, B3, the methods M1B, M2B and the interface I4 are loaded into the client to support proxy 870 serving as a proxy to an object of class 820. Since the attributes A1, A2, A3, methods M1, M2, M3, interfaces I1, I2 and I3 and related metadata were already loaded and associated with the proxy 850, such items do not need to be reloaded for the proxy 870, and thus the incremental extension is achieved, providing advantages over conventional systems that do not perform such incremental extension.

At a still later point in time, a request may arrive to cast the proxy 870 from a proxy for an object of class 820 to a proxy for an object of class 840. Thus, the present invention may again examine metadata, may examine the class definitions, and/or invoke one or more reflection methods, for example, to determine whether the class 840 and the class 820 are related, and if so, what, if any additional items are required to load into the client to facilitate the proxy 890 serving as a proxy to an object of class 840. The present invention may identify the set of items required to support the proxy 890 as listed in block 895. Having determined that class 840 is a descendant of class 820, the present invention may then determine that the attributes D1, D2, the method M1D and the interfaces I6 and I7 are required to be loaded into the client to facilitate the proxy 890 serving as a proxy to an object of class 840. In one example of the present invention, the attributes D1, D2, the method M1D and the interfaces I6 and I7 are loaded in association with initializing the proxy 890, while in another example of the present invention, one or more of the attributes D1, D2, the method M1D and the interfaces I6 and I7 are loaded on an as-needed basis.

FIG. 9 illustrates an inheritance hierarchy 900. The hierarchy 900 has a base class 910 that includes the attributes A1, A2, A3, the methods M1, M2, M3 and the interfaces I1, I2 and I3. Two classes inherit directly from the base class 910. The class 920 inherits from the class 910 and adds the attributes B1, B2, B3, the methods M1B, M2B and the interface I4. Similarly, the class 930 inherits from the base class 910 and adds the attributes C1, C2, C3, the method M1C and the interface I5. In addition to the two classes that inherit directly from the base class 910, two classes inherit from the derived class 920. The class 940 derives from the derived class 920 and adds the attributes D1, D2, the method M1D and the interfaces I6 and I7. Similarly, the class 945 derives from the derived class 920 and adds the attributes E1, E2, E3, the methods M1E, M2E and the interface I8.

By way of illustration, a first proxy 950 may be a proxy for an object of class 910. The present invention may identify the set of items required to support the proxy 950 as listed in block 960. Thus, the client will load items to support the proxy (e.g., attributes A1, A2, A3, methods M1, M2, M3, interfaces I1, I2 and I3, related metadata). In one example of the present invention, the items will be loaded in association with initializing the proxy 950. In another example of the present invention, one or more of the items may not be loaded in association with initializing the proxy 950 and thus may be loaded later, on an as-needed basis.

At a later point in time, a request may arrive to cast the proxy 950 from a proxy for an object of class 910 to a proxy for an object of class 940. Thus, the present invention may examine metadata, and/or invoke one or more reflection methods, for example, to determine whether the class 910 and the class 940 are related, and if so, what, if any, additional items are required to load into the client to facilitate the proxy 970 serving as a proxy to an object of class 940. In FIG. 9, the class 910 and the class 940 are related in an ancestor/descendant manner in the inheritance hierarchy 900. The present invention is thus able to determine that in addition to the items currently loaded for the proxy 950, additional items are required to be loaded for the proxy 970. The present invention may identify the set of items required to support the proxy 970 as listed in block 980. Thus, the attributes B1, B2, B3, the methods M1B, M2B and the interface I4 are loaded into the client to support proxy 970 serving as a proxy to an object of class 940. Additionally, the attributes D1, D2, the method M1D and the interfaces I6 and I7 are loaded into the client to support proxy 970 serving as a proxy to an object of class 940. Since the attributes A1, A2, A3, methods M1, M2, M3, interfaces I1, I2 and I3 and related metadata were already loaded and associated with the proxy 950, such items do not need to be reloaded for the proxy 970, and thus the incremental extension is achieved, providing advantages over conventional systems that do not perform such incremental extension.

At a still later point in time, a request may be received to cast the proxy 970 to a proxy 990 that can image an object of class 945. Again the present invention may examine items including, but not limited to, metadata, and class definitions to determine whether the class 940 and the class 945 are related, and if so, what, if any, additional items are required to load into the client to facilitate the proxy 990 serving as a proxy to an object of class 945. In the hierarchy 900 in FIG. 9, the classes 940 and 945 both inherit from a common ancestor type 920, and thus, many of the items required to support the proxy 990 as a proxy to an object of class 945 are already loaded in the client, and do not require reloading. The present invention may identify the set of items required to support the proxy 990 as listed in block 995. Thus, the present invention loads the attributes E1, E2, E3, the methods M1E, M2E and the interface I8, while not reloading the attributes B1, B2, B3, the methods M1B, M2B and the interface I4. Thus, incremental proxy refinement is achieved, and processing time and/or memory requirement problems associated with conventional systems are mitigated.

FIG. 10 illustrates an inheritance hierarchy 1000. The hierarchy 1000 has a base class 1010 that includes the attributes A1, A2, A3, the methods M1, M2, M3 and the interfaces I1, I2 and I3. Two classes inherit directly from the base class 1010. The class 1020 inherits from the class 1010 and adds the attributes B1, B2, B3, the methods M1B, M2B and the interface I4. Similarly, the class 1030 inherits from the base class 1010 and adds the attributes C1, C2, C3, the method M1C and the interface I5. In addition to the two classes that inherit directly from the base class 1010, two classes inherit from the derived class 1020. The class 1040 derives from the derived class 1020 and adds the attributes D1, D2, the method M1D and the interfaces I6 and I7. Similarly, the class 1045 derives from the derived class 920 and adds the attributes E1, E2, E3, the methods M1E, M2E and the interface I8.

By way of illustration, a first proxy 1050 may be a proxy for an object of class 1010. The present invention may identify the set of items required to support the proxy 1050 as listed in block 1060. Thus, the client will load items to support the proxy (e.g., attributes A1, A2, A3, methods M1, M2, M3, interfaces I1, I2 and I3, related metadata). In one example of the present invention, the items will be loaded in association with initializing the proxy 1050. In another example of the present invention, one or more of the items may not be loaded in association with initializing the proxy 1050 and thus may be loaded later, on an as-needed basis.

At a later point in time, a request may arrive to cast the proxy 1050 from a proxy for an object of class 0110 to a proxy for an object of class 1040. Thus, the present invention may examine metadata, and/or invoke one or more reflection methods, for example, to determine whether the class 1010 and the class 1040 are related, and if so, what, if any, additional items are required to load into the client to facilitate the proxy 1070 serving as a proxy to an object of class 1040. In FIG. 10, the class 1010 and the class 1040 are related in an ancestor/descendant manner in the inheritance hierarchy 1000. The present invention is thus able to determine that in addition to the items currently loaded for the proxy 1050, additional items are required to be loaded for the proxy 1070. The present invention may identify the set of items required to support the proxy 1070 as listed in block 1080. Thus, the attributes B1, B2, B3, the methods M1B, M2B and the interface I4 are loaded into the client to support proxy 1070 serving as a proxy to an object of class 1040. Additionally, the attributes D1, D2, the method M1D and the interfaces I6 and I7 are loaded into the client to support proxy 1070 serving as a proxy to an object of class 1040. Since the attributes A1, A2, A3, methods M1, M2, M3, interfaces I1, I2 and I3 and related metadata were already loaded and associated with the proxy 1050, such items do not need to be reloaded for the proxy 1070, and thus the incremental extension is achieved, providing advantages over conventional systems that do not perform such incremental extension.

At a still later point in time, a request may arrive to cast the proxy 1070 from a proxy that supports imaging an object of class 1040 to a proxy 1090 that supports imaging an object of class 1030. The present invention may then examine data including, but not limited to, metadata, class hierarchy information and class definitions to determine whether the class 1030 and the class 1040 are related. In the hierarchy 1000, the class 1030 and the class 1040 share a common ancestor class 1010. Thus, there is some overlap between the classes and incremental refinement of the proxy 1070 to the proxy 1090 is possible. The present invention may identify the items required to support the proxy 1090 serving as a proxy to an object of type 1030 as identified in block 1095. Then, the present invention may load items (e.g., attributes C1, C2, C3, method M1C, interface I5) required to support the proxy 1090 serving as a proxy to an object of type 1030, again achieving incremental extension and improved proxy refinement. In one example of the present invention, the attributes C1, C2, C3, method M1C and interface I5 may be loaded as part of the initialization of the proxy 1090, while in another example of the present invention, one or more of the attributes C1, C2, C3, method M1C, interface I5 may be loaded on an as-needed basis.

While the hierarchies 800 (FIG. 8), 900 (FIG. 9) and 1000 (FIG. 10) illustrate one base class with four descendant classes, it is to be appreciated that a greater or lesser number of classes may be employed in accordance with the present invention.

FIG. 111 illustrates a sample data packet 1100 employed in facilitating interaction between a client and server with mismatched data types. The data packet 1100 is adapted to be transmitted between two computer processes (e.g., a server process and a client process). The data packet 1100 may contain information including, but not limited to, information concerning data type attributes, information concerning data type methods, information concerning data type interfaces and information concerning data types to which the data type is related (e.g., data types from which a data type inherits).

One example data packet 1100 contains attribute information 1110. The attribute information 1110 includes information related to N attributes, N being an integer. The attribute information 1110 may identify characteristics including, but not limited to, the name of an attribute, the size of an attribute, the data type of an attribute and methods available for an attribute (e.g., get, set). The example data packet 1100 may also contain method information 1120. The method information 1120 includes information related to X methods, X being an integer. The method information 1120 may identify characteristics including, but not limited to, the name of a method, the size of a method, the number and types of input parameters associated with a method and the number and types of return parameters associated with a method. The example data packet 1100 may also contain interface information 1130 related to Y interfaces, Y being an integer. The interface information 1130 may identify characteristics including, but not limited to, the name of an interface, the number of methods implemented in the interface and the names of the methods implemented in the interface. The example data packet 1100 may also include related data type information 1140. The related data type information 1140 may identify, for example, ancestors and known descendants of the data type.

Figure 12:
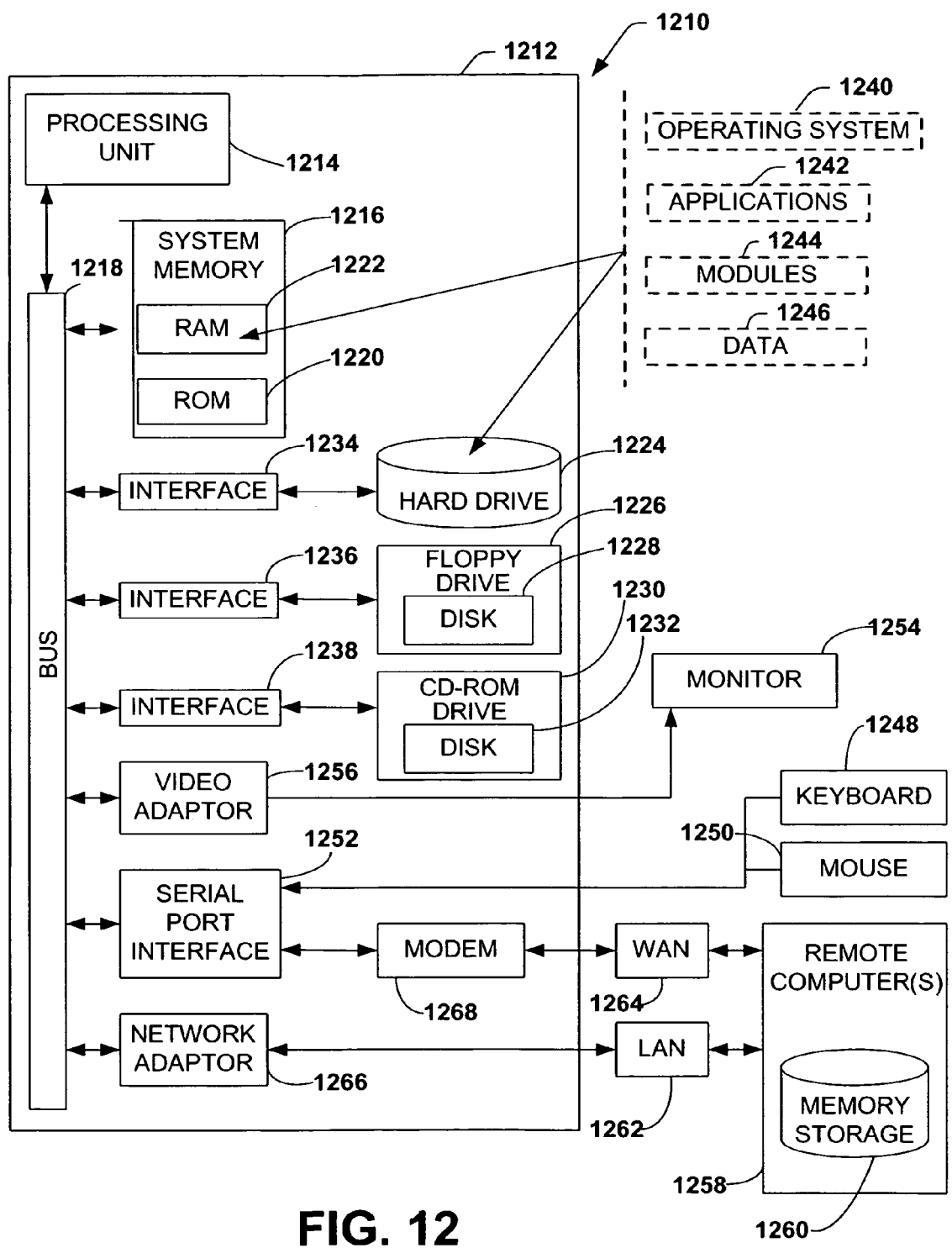
FIG. 12 is a schematic block diagram of an exemplary operating environment for a system configured in accordance with the present invention.

In order to provide additional context for various aspects of the present invention, FIG. 12 and the following discussion are intended to provide a brief, general description of one possible suitable computing environment 1210 in which the various aspects of the present invention may be implemented. It is to be appreciated that the computing environment 1210 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 12 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 12, an exemplary environment 1210 for implementing various aspects of the invention includes a computer 1212, including a processing unit 1214, a system memory 1216, and a system bus 1218 that couples various system components including the system memory to the processing unit 1214. The processing unit 1214 may be any of various commercially available processors. Dual microprocessors and other multi-processor architectures also can be used as the processing unit 1214.

The system bus 1218 may be any of several types of bus structure including a memory bus or memory controller, a peripheral bus, and a local bus using any of a variety of commercially available bus architectures. The computer memory 1216 includes read only memory (ROM) 1220 and random access memory (RAM) 1222. A basic input/output system (BIOS), containing the basic routines that help to transfer information between elements within the computer 1212, such as during start-up, is stored in ROM 1220.

The computer 1212 may further include a hard disk drive 1224, a magnetic disk drive 1226, e.g., to read from or write to a removable disk 1228, and an optical disk drive 1230, e.g., for reading a CD-ROM disk 1232 or to read from or write to other optical media. The hard disk drive 1224, magnetic disk drive 1226, and optical disk drive 1230 are connected to the system bus 1218 by a hard disk drive interface 1234, a magnetic disk drive interface 1236, and an optical drive interface 1238, respectively. The computer 1212 typically includes at least some form of computer readable media. Computer readable media can be any available media that can be accessed by the computer 1212. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1212. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1222, including an operating system 1240, one or more application programs 1242, other program modules 1244, and program non-interrupt data 1246. The operating system 1240 in the illustrated computer can be any of a number of commercially available operating systems.

A user may enter commands and information into the computer 1212 through a keyboard 1248 and a pointing device, such as a mouse 1250. Other input devices (not shown) may include a microphone, an IR remote control, a joystick, a game pad, a satellite dish, a scanner, or the like. These and other input devices are often connected to the processing unit 1214 through a serial port interface 1252 that is coupled to the system bus 1218, but may be connected by other interfaces, such as a parallel port, a game port, a universal serial bus ("USB"), an IR interface, etc. A monitor 1254, or other type of display device, is also connected to the system bus 1218 via an interface, such as a video adapter 1256. In addition to the monitor, a computer typically includes other peripheral output devices (not shown), such as speakers, printers etc.

The computer 1212 may operate in a networked environment using logical connections to one or more remote computers, such as a remote computer(s) 1258. The remote computer(s) 1258 may be a workstation, a server computer, a router, a personal computer, microprocessor based entertainment appliance, a peer device or other common network node, and typically includes many or all of the elements described relative to the computer 1212, although, for purposes of brevity, only a memory storage device 1260 is illustrated. The logical connections depicted include a local area network (LAN) 1262 and a wide area network (WAN) 1264. Such networking environments are commonplace in offices, enterprise-wide computer networks, intranets and the Internet.

When used in a LAN networking environment, the computer 1212 is connected to the local network 1262 through a network interface or adapter 1266. When used in a WAN networking environment, the computer 1212 typically includes a modem 1268, or is connected to a communications server on the LAN, or has other means for establishing communications over the WAN 1264, such as the Internet. The modem 1268, which may be internal or external, is connected to the system bus 1218 via the serial port interface 1252. In a networked environment, program modules depicted relative to the computer 1212, or portions thereof, may be stored in the remote memory storage device 1260. It will be appreciated that the network connections shown are exemplary and other means of establishing a communications link between the computers may be used.

Figure 13:
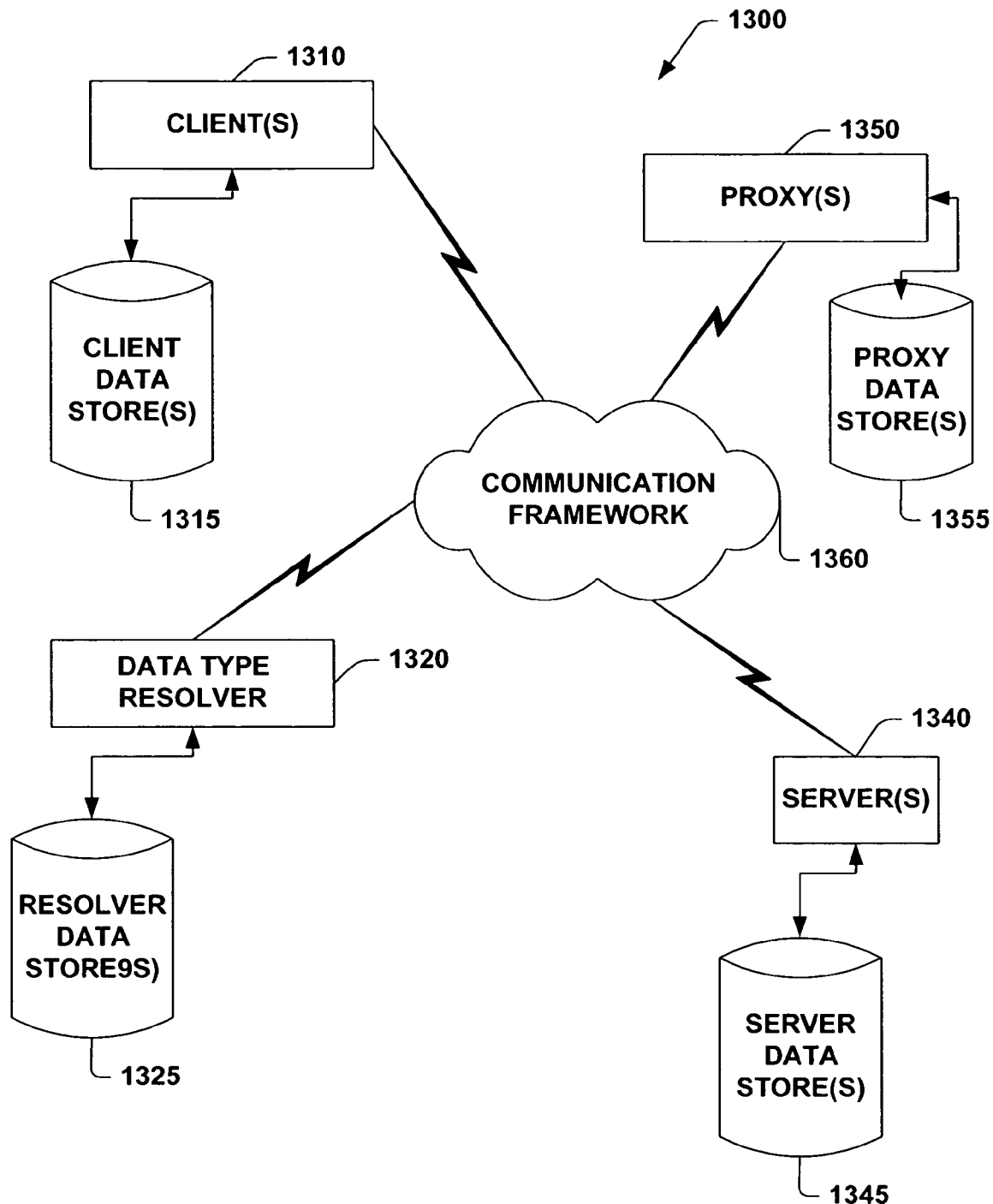
FIG. 13 is a schematic block diagram of an exemplary computing environment for a method performing in accordance with the present invention.

FIG. 13 is a schematic block diagram of a sample computing environment 1300 with which the present invention may interact. The system 1300 includes one or more clients 1310. The clients 1310 may be hardware and/or software (e.g., threads, processes, computing devices). The clients 1310 may attempt to interact with one or more objects located local to the clients 1310 and/or remotely to the clients 1310. Such objects may be imaged by one or more proxies 1350.

The system 1300 includes a communication framework 1360 that can be employed to facilitate communications between the clients 1310, the servers 1340 and the proxies 1350. In an example system where the clients 1310 and the proxies 1350 are located within one physical device, the communication framework 1360 may include, for example, an interprocess communication process and a bus. In an example where the clients 1310, the proxies 1350 and the servers 1340 are distributed between a plurality of physical devices, the communication framework 1360 may include, for example, networking hardware and software, both wired and non-wired.

The clients 1310 are operably connected to one or more client data stores 1315 that can be employed to store information local to the clients 1310. Likewise, the servers 1340 may be operably connected to one or more server data stores 1345 and the proxies 1350 may be operably connected to one or more proxy data stores 1355 that can be employed to store information local to the servers 1340 and the proxies 1350 respectively.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates interactions between a first entity and a second entity, where the entities have a mismatched data type with at least one aspect in common, the system comprising:
    a data type identifier that identifies whether the first entity and the second entity have a mismatched resolvable data type; and
    a data type resolver that receives the mismatched resolvable data type from the data type identifier and resolves interactions between the first entity and the second entity by resolving the mismatched resolvable data type in accordance with the at least one common aspect, the data type resolver comprising:
    a metadata reader that reads metadata associated with a resolvable data type and identifies at least one common aspect in the resolvable data type, the resolvable data type is associated with a proxy and is incrementally extensible;
    a method identifying subsystem connected to the metadata reader, the method identifying subsystem identifies a method associated with the resolvable data type; and
    a method populating subsystem connected to the method identifying subsystem, the method populating subsystem establishes a link to the method.

2. The system of claim 1, where the first entity is a client and the second entity is a server.

3. The system of claim 1, where the at least one common aspect comprises at least one of a data aspect and a behavior aspect.

4. The system of claim 1, where the data type resolver comprises:
    an attribute identifying subsystem that is connected to the metadata reader, the attribute identifying subsystem identifies an attribute associated with a resolvable data type; and
    an attribute populating subsystem connected to the attribute identifying subsystem, the attribute populating subsystem that establishes a value in the attribute.

5. The system of claim 1, where the resolvable data type is incrementally extensible on an as-needed basis.

6. A computer readable medium containing computer executable components for a system that facilitates interactions between two or more entities, where the entities have a mismatched data type with at least one common aspect, the components comprising:
    a data type identifying component that identifies whether the first entity and the second entity have a mismatched resolvable data type; and
    a data type resolving component that receives the mismatched resolvable data type from the data type identifier and resolves interactions between the first entity and the second entity by resolving the mismatched resolvable data type and creates a new data type that comprises the at least one common aspect, the data type resolver comprising:
    a metadata reader that reads metadata associated with a resolvable data type and identifies at least one common aspect in the resolvable data type, the resolvable data type is associated with a proxy and is incrementally extensible;
    a method identifying subsystem connected to the metadata reader, the method identifying subsystem identifies a method associated with the resolvable data type; and
    a method populating subsystem connected to the method identifying subsystem, the method populating subsystem establishes a link to the method.

7. A system for facilitating interaction between two or more entities, where the entities have a mismatched data type, the system comprising:
    means for receiving during interaction between two or more entities a first data type that is a mismatched data type with a second data type;
    means for employing metadata to determine whether a first object of a first data type has at least one aspect common to a second object of a second data type;
    means for resolving the mismatched data type by producing a third object of a third data type during interaction between the two or more entities, the third data type is associated with a proxy and is incrementally extensible and comprises the at least one aspect common to the first data type and the second data type;
    means for identifying a method associated with the resolvable data type; and
    means for establishing a link to the method.

8. The system of claim 7, where the first data type is incrementally extensible on an as-needed basis.

* * * * *